United States Patent
Shah et al.

(10) Patent No.: US 10,026,132 B2
(45) Date of Patent: Jul. 17, 2018

(54) CHRONOLOGICAL INFORMATION MAPPING

(71) Applicant: Microsoft Technology Licensing, LLC, Redmond, WA (US)

(72) Inventors: Virag Shah, Hyderabad (IN); Ashish Kothari, Hyderabad (IN); Ankur Jhawar, Hyderabad (IN); Paridhi Verma, Lucknow (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 14/810,954

(22) Filed: Jul. 28, 2015

(65) Prior Publication Data
US 2017/0031536 A1 Feb. 2, 2017

(51) Int. Cl.
*G06F 3/048* (2013.01)
*G06Q 50/00* (2012.01)
*G06Q 10/10* (2012.01)

(52) U.S. Cl.
CPC ............. *G06Q 50/01* (2013.01); *G06Q 10/10* (2013.01)

(58) Field of Classification Search
CPC ........................ G06F 3/0482; G06F 3/04842
See application file for complete search history.

(56) References Cited

U.S. PATENT DOCUMENTS

| | | | |
|---|---|---|---|
| 6,032,184 A | 2/2000 | Cogger et al. | |
| 6,438,547 B1 | 8/2002 | Mehr et al. | |
| 7,225,139 B1 | 5/2007 | Tidwell et al. | |
| 7,353,182 B1 | 4/2008 | Missinhoun et al. | |
| 8,341,036 B2 | 12/2012 | Hartman et al. | |
| 8,473,432 B2 | 6/2013 | Anerousis et al. | |
| 8,521,572 B2 | 8/2013 | Hanson et al. | |
| 2005/0081188 A1 | 4/2005 | Kumar et al. | |
| 2009/0300544 A1* | 12/2009 | Psenka | G06F 17/30554 715/810 |
| 2011/0021250 A1* | 1/2011 | Ickman | G06F 17/30867 455/566 |
| 2011/0202866 A1* | 8/2011 | Huang | G06F 3/0482 715/779 |
| 2011/0295694 A1 | 12/2011 | Coggeshall et al. | |
| 2012/0036197 A1 | 2/2012 | Bishop | |
| 2012/0131507 A1 | 5/2012 | Sparandara et al. | |
| 2013/0212491 A1* | 8/2013 | Yerli | H04L 51/32 715/753 |
| 2013/0262168 A1* | 10/2013 | Makanawala | H04L 51/32 705/7.14 |
| 2014/0278785 A1 | 9/2014 | Gaedcke et al. | |
| 2014/0282010 A1* | 9/2014 | Young | G06Q 10/06 715/730 |

OTHER PUBLICATIONS

Quora, Joel Montgomery., "Is the Domino's Pizza Tracker Telling the Truth?", Published on: Oct. 8, 2014 Available at: http://www.gizmodo.com.au/2014/10/is-the-dominos-pizza-tracker-telling-the-truth/.

* cited by examiner

*Primary Examiner* — Anil Bhargava
(74) *Attorney, Agent, or Firm* — Christopher J. Volkmann; Kelly, Holt & Christenson, PLLC

(57) ABSTRACT

An activity is detected in a computer system. The activity is correlated to a given entity. A line item display is generated for the detected activity and contextual actions are identified for the line item display. The line item display, with contextual action mechanisms is added to a chronological display structure which is surfaced for user interaction.

20 Claims, 21 Drawing Sheets

US 10,026,132 B2

CHRONOLOGICAL INFORMATION MAPPING

BACKGROUND

Computing systems are currently in wide use. Many computing systems are deployed by organizations in order to facilitate the performance of tasks needed to run the organization.

When issues arise with respect to the operation of a given computing system, many different people can be involved in performing a wide variety of different tasks, in order to address the issue. Some issues with computing systems can be long running issues that are relatively complex in nature. Information used by those involved in addressing the issue can come from a wide variety of different sources. For instance, it can come from a knowledge base, an enterprise application (such as ERP or CRM applications or line-of-business applications), email systems, the email systems of external users (such as customers), inputs from engineers, technical information, manuals, etc. Some of this information may be relevant to some users, but be completely irrelevant to other users.

In addition, there may be a variety of different types of information that are relevant to the issue being addressed. Such information can include telephone conversations, emails, messages, meetings, actions taken by engineering personnel, and a wide variety of other information. It can be difficult for a user who is addressing the computing system issue to access all of this information in a meaningful way.

Also, the process by which a computing system issue is resolved can be generally unstructured. That is, each computing system issue may need a unique process or set of steps in order to address it. Thus, capturing relevant information and making it accessible in a meaningful way can be further exacerbated by the nature of the processes used to resolve such issues.

The discussion above is merely provided for general background information and is not intended to be used as an aid in determining the scope of the claimed subject matter.

SUMMARY

An activity is detected in a computer system. The activity is correlated to a given entity. A line item display is generated for the detected activity and contextual actions are identified for the line item display. The line item display, with contextual action mechanisms is added to a chronological display structure which is surfaced for user interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
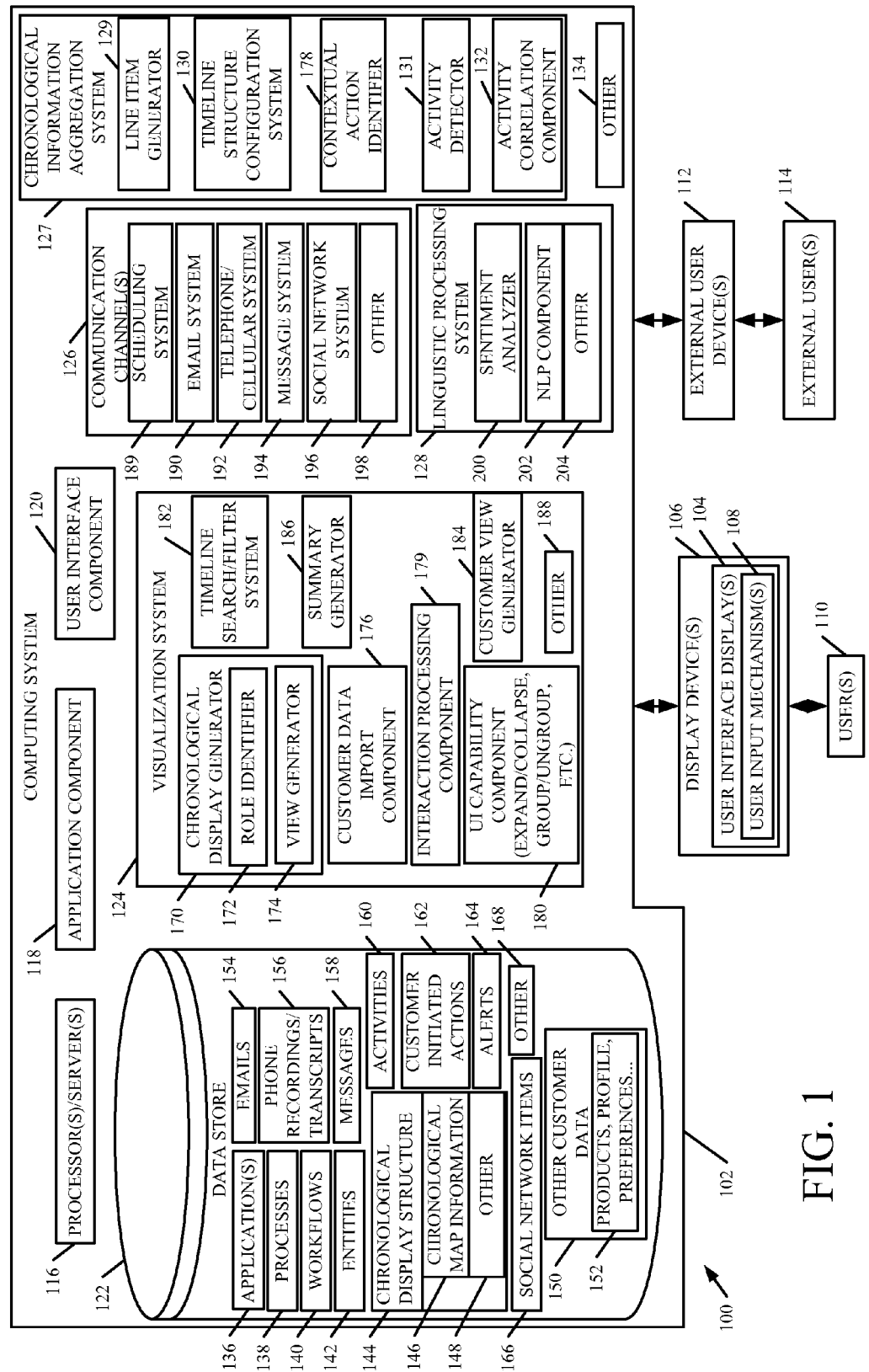
FIG. 1 is a block diagram of one example of a computing system architecture.

FIG. 1 is a block diagram of one example of a computing system architecture 100. Architecture 100 illustratively includes computing system 102 that generates user interface displays 104 on a display device 106. Displays 104 can illustratively have user input mechanisms 108 for interaction by users 110. Users 110 illustratively interact with user input mechanisms 108 in order to control and manipulate computing system 102. Users 110 may, for example, be end users of computing system 102, administrative users of computing system 102, or other users.

Architecture 100 also shows that, in one example, computing system 102 can communicate with one or more external user devices (e.g., customer devices which, as described below, can be mobile devices, cell phones, tablet computers, desktop or laptop computers, etc.) 112. External users (such as customers) 114, may have certain types of access to computing system 102, through devices 112. For instance, external users 114 may be able to browse a website showing products or services offered by an organization deploying computing system 102, or they may be able to communicate with various users (e.g., engineers, sales representatives, managers, etc.) of the organization deploying computing system 102.

In the example shown in FIG. 1, computing system 102 illustratively includes processors or servers 116, application component 118, user interface component 120, data store 122, visualization system 124, communication channels (or communication systems) 126, chronological information generation system 127 (which, itself, can include linguistic processing system 128, line item generator 129, timeline structure configuration system 130, issue correlation component 132, and contextual action identifier 178) and it can include other items 134.

Data store 122 can include applications 136, processes 138, workflows 140, entities 142, a set of chronological display structures 144 that include chronological map information 146 and can include other items 148 such as audit logs, click stream data or other items, as well as other customer data 150. The other customer data 150 can include product information, profile information, preferences 152, among a wide variety of other information. In the example shown in FIG. 1, data store 122 can also illustratively store emails 154, phone recordings or transcripts 156, messages 158, activities 160, customer-initiated actions 162, alerts 164, social network items (e.g., blog posts, other social network posts, etc.) 166, and it can include other items 168, such as calendar or meeting data or a wide variety of other information.

In the example shown in FIG. 1, visualization system 124 can include chronological display generator 170 (which, itself, can include role identifier 172 and view generator 174), customer data import component 176, interaction processing component 179, user interface (UI) capability component 180, timeline search/filter system 182, customer view generator 184, summary generator 186, and it can include other items 188. Communication channels 126 can include a wide variety of different types of systems that can enable communication between users, external users, or other entities, and computing system 102. For instance, channels 126 can include scheduling system 189, email system 190, telephone/cellular system 192, messaging system 194, social network system 196, and it can include other items 198. Linguistic processing system 128 illustratively includes sentiment analyzer 200, natural language processing (NLP) component 202, (which can also include speech recognition and speech synthesis components) and it can include other items 204. Before describing the overall operation of computing system 102 in more detail, a brief overview of sonic of the items in computing system 102, and their operation, will first be provided.

Application component 118 illustratively runs applications 136 to perform processes 138, workflows 140, etc. It can operate on entities 142 or a wide variety of other records or information in data store 122, or received from external systems.

Communication systems 126 illustratively generate some of the items of information stored in data store 122. For instance, scheduling system 189 can generate meeting and other scheduling or calendar information. Email system 190 generates and receives emails 154. Telephone/cellular system 192 generates and receives telephone communications which can be recorded or transcribed to generate recordings or transcripts 156. Messaging system 194 illustratively generates and receives messages 158. Social network system 196 interacts with social networks to illustratively generate and receive social network items 166. The applications, themselves, can perform activities 160, receive customer-initiated actions 162 and generate various alerts 164. Linguistic processing system can use NLP components 202 to generate an understanding of textual or spoken information, and sentiment analyzer 200 can analyze the sentiment of that information (such as whether a customer voicemail or email indicates that the customer is angry, etc.). The information generated by linguistic processing system 128 can be stored in data store 122 and chronological display structure 144 as well.

Chronological information generation system 127 illustratively allows a user to configure different chronological display structures (or timeline views) to be generated, and then populates them during runtime. For instance, timeline structure configuration system 130 illustratively allows a user 110 (such as an administrative user or other user), to configure or specify the types of activities that are to be included in a chronological display structure (or timeline display structure) being configured by the user 110. It may, for example, be that the user 110 wishes the timeline display structure to show all activities related to a computing system issue that is raised by a given external user (or customer) 114. When such a timeline display structure is populated during runtime, activity detector 131 detects when any of the activities occur and issue correlation component 132 correlates them to the particular issue, external user (e.g., customer), computing system, or other items for which the timeline display structure is to be generated. Line item generator 129 generates a line item display that represents the detected activity. Contextual action identifier 178 identifies contextual actions that may be available for each of the line items generated by line item generator 129, in the chronological display structure 144 and provides user input mechanisms that allow user 110 to perform contextual actions with respect to each of the line items. Representations of those activities are then stored in data store 122 and the line items are also stored as chronological map information 146 in the chronological display structure 144 to which the activity has been correlated.

Visualization system 124 illustratively surfaces the populated chronological display structures for user interaction. For example, system 124 illustratively receives inputs from users 110 and uses user interface component 120 to control display device 106 to surface a populated chronological display structure (or chronological display) as a user interface display 104 on a display device 106 for the requesting user. In doing so, customer data import component 176 illustratively imports customer data (such as customer identifying data or other customer data 150) and role identifier 172 identifies the role of the user requesting the display. View generator 174 then generates a role-specific timeline view or chronological display for the requesting user 110. The generated view is a populated chronological display structure. Interaction processing component 178 processes various user interactions with the view. UI capability component 180 illustratively allows the user to perform various UI capabilities (such as to collapse or expand items, to group or ungroup items, etc.). Summary generator 186 generates summaries of various metrics of information and displays those on the chronological display as well. Timeline search/filter system 182 generates user input mechanisms that can be actuated by user 110 in order to search or filter the chronological display (or timeline display) as desired. In some contexts, it may be that an external user (or customer) 114 may have access to certain portions of the timeline view. In that case, customer view generator 184 generates a customer view that can be accessed by the external user 114.

Figure 2:
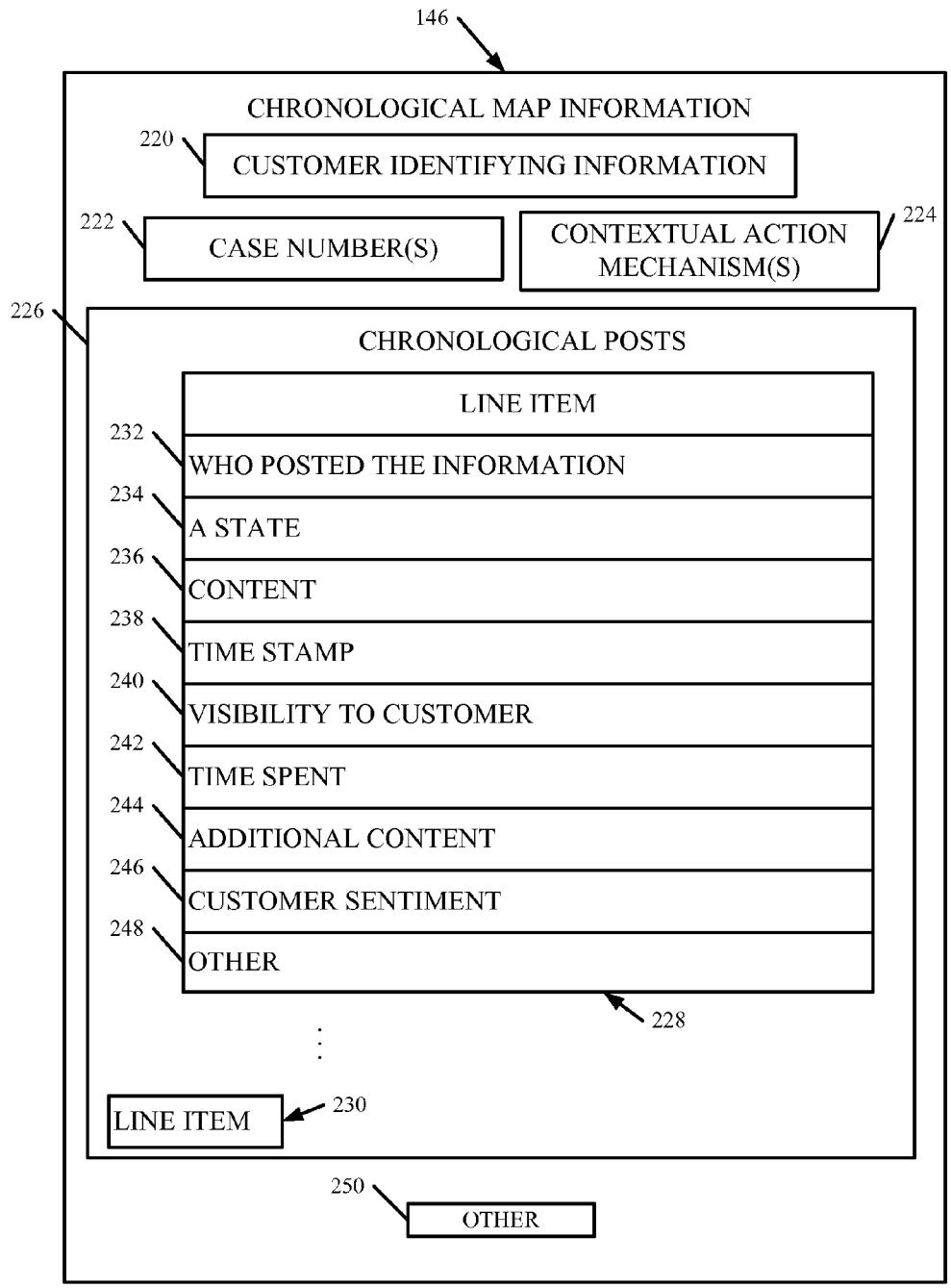
FIG. 2 is a block diagram of one example of a set of chronological map information.

FIG. 2 shows a block diagram of one example of a set of chronological map information 146 that can be contained in a chronological display structure 144. Information 146 can include customer identifying information 220, a case number or other issue identifier 222, a set of contextual action user input mechanisms 224 that can be actuated to take contextual action, and a set of chronological posts 226 that can include a plurality of different line items 228-230, each representing an activity that was detected by activity detector 131 and that is to be included in the chronological display structure 144, as configured using timeline structure configuration system 130. Each of the line items 228-230 can include a wide variety of different types of information, such as the identity of who generated or posted the information 232. This can include not only human generated posts, but system-generated posts as well. It can include a state of the activity (such as whether an issue is resolved, whether a meeting has been scheduled or conducted, etc.). The state information is indicated by block 234. It can include content 236 that further defines the line item. It can include a timestamp 238 indicative of when the line item was generated. It can include the customer sentiment identifier 246 that identifies the sentiment of the customer with respect to the detected activity, and it can include a wide variety of other information 248. By way of example, some systems allow organizations to add more information, such as department of a user, language, region, etc. The chronological map information 146 can also include other information 250.

Figure 2A:
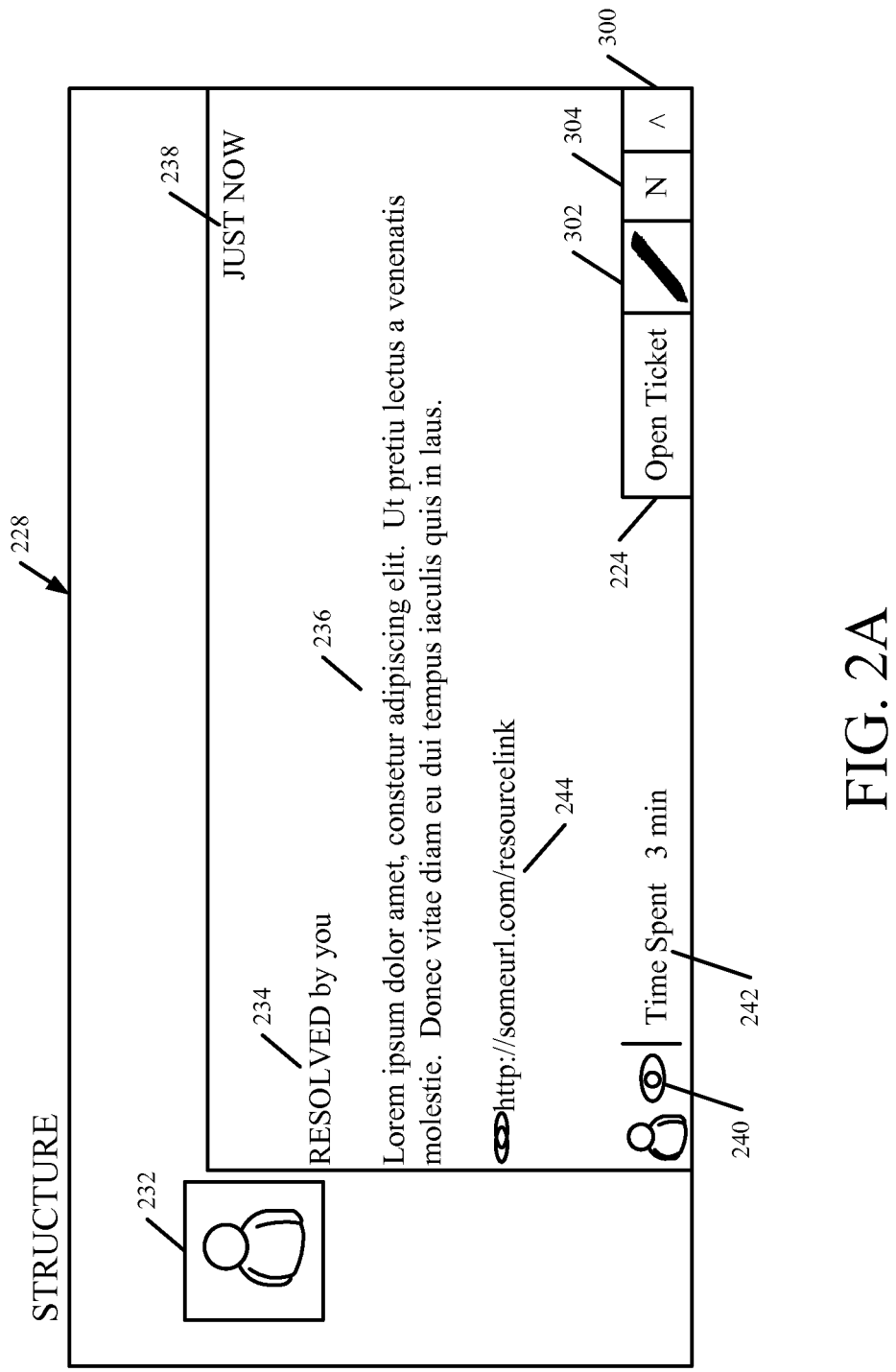
FIG. 2A is one example of a line item display.

FIG. 2A shows a more detailed view of one example of a line item 228. The example shown in FIG. 2A is only one example and the look and feel, the content, or other things about the line item 228 can vary widely. It can be seen in FIG. 2A that line item 228 illustratively includes an identifier 232 that identifies who created or generated the activity that gave rise to line item 228. This can be a human being or the system, itself. In one example, identifier 232 can include extra visual indicia that indicate whether it was done by an internal user or external user. For instance, if it was done by an external user (e.g., a customer) 114, then identifier 232 may be circled, shaded, blinking, highlighted in a given color, etc. Line item 228 also illustratively includes a state or status identifier 234 that indicates the state or status of the line item. In the example shown in FIG. 2A, it shows that the activity corresponding to the line item has been resolved. Line item 228 illustratively includes content 236 which, in the example shown in FIG. 2A, is a textual description of the activity that gave rise to the line item. It can include timestamp 238 that indicates when the line item was generated, and it can include visibility indicator 240 that indicates whether the line item is visible to the customer. It can include time spent indicator 242 that identifies an amount of time spent on the activity that gave rise to the line item 228 and it can include additional content identifier 244 that identifies any additional content. In the example shown in FIG. 2A, identifier 244 is a link to additional content. The line item 228 shown in FIG. 2A also illustratively includes user input mechanisms 300 for performing a variety of different kinds of UI functionality. For instance, user input mechanisms 300 can be actuated to toggle between expanding and collapsing information related to line item 228. It also illustratively includes user input mechanisms 302 and 304 which, in the example shown in FIG. 2A, allow the user to edit line item 228 or access a note-taking system corresponding to line item 228, respectively. In addition, line item 228 includes contextual action mechanism 224 that allows the user to take a contextual action relative to line item 228. Since line item 228 reflects a customer issue, contextual action mechanism 224 is illustratively an "open ticket" mechanism that can be actuated by a user to open a ticket in a customer service computing system.

It will be appreciated that the context can include a wide variety of things. It can, for instance, include which application generated the detected activity (an email, a social network post, etc.). It can include an entity or process or workflow affected by the activity (e.g., customer complaint, customer issue process, etc.). It can, of course, include other things as well. The contextual actions can take a wide variety of different forms. They can be based on the type of activity that the line item represents, or the status of the line item, etc. For instance, a line item that represents a closed phone call activity may include contextual action mechanisms that allow the user to play a recording of the phone call, to view notes from the phone call or to view details from the phone call. A line item that represents an open phone call activity may include contextual mechanisms that allow the user to edit a phone call record, mark it completed, create a follow up or send an email. A line item that represents an article may provide contextual mechanisms that allow the user to copy a link to the article, send an email with the article, link or unlink the article to other items, etc. Where the line item represents an activity that is a search by a customer, the contextual action mechanisms may allow the user to view the search results that were displayed to the customer, access those search results, etc. Where the line item represents an activity that is a closed chat activity, the mechanisms may allow the user to view a transcript of the chat. Where it is an open chat conversation, the mechanisms may allow the user to continue the chat, send an attachment, send a link to an article, convert the chat activity to a case, etc. Of course, these are examples only.

Figure 2B:
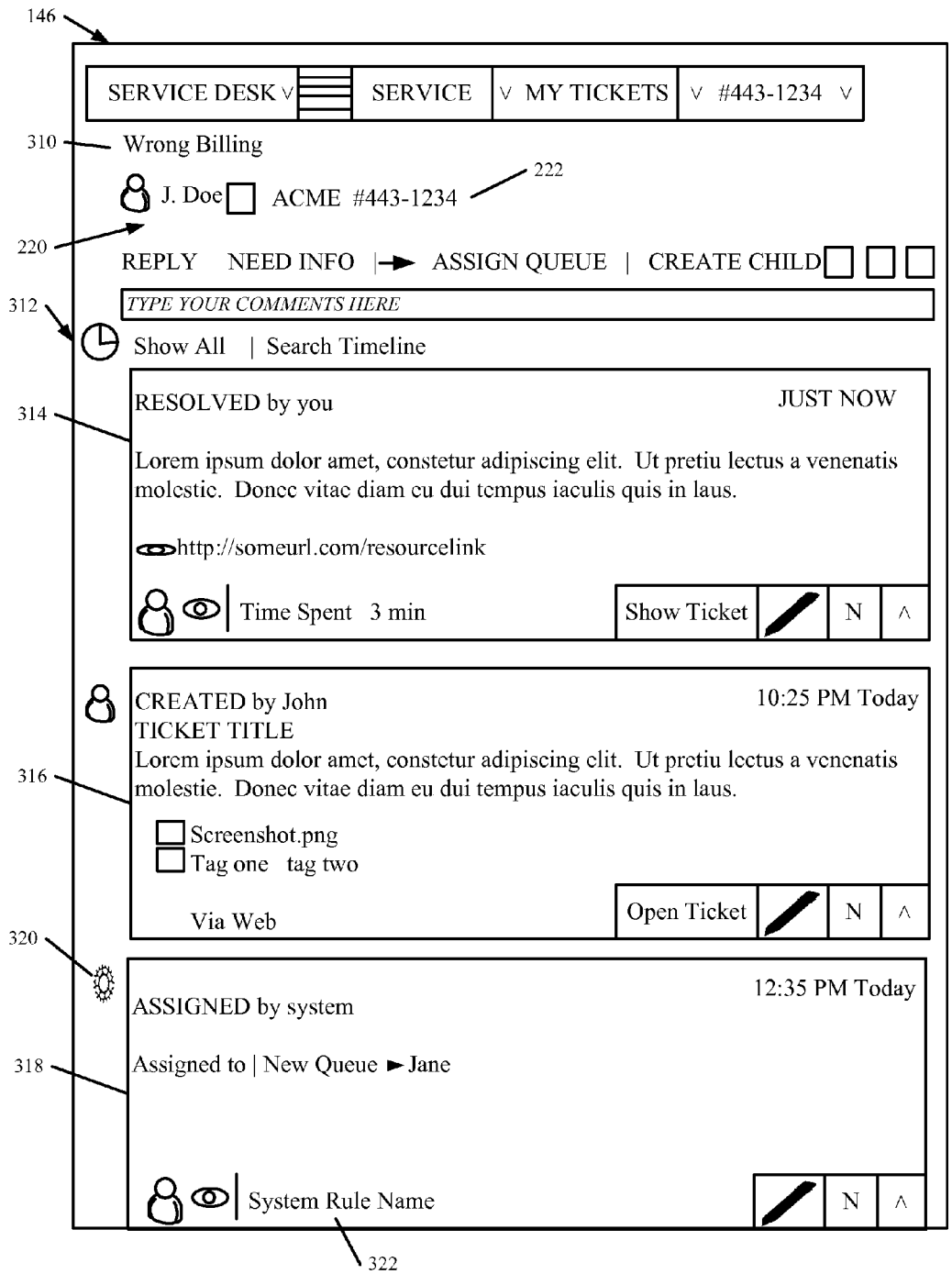
FIGS. 2B-2D show various examples of user interface displays illustrating a chronological display structure.
Figure 2C:
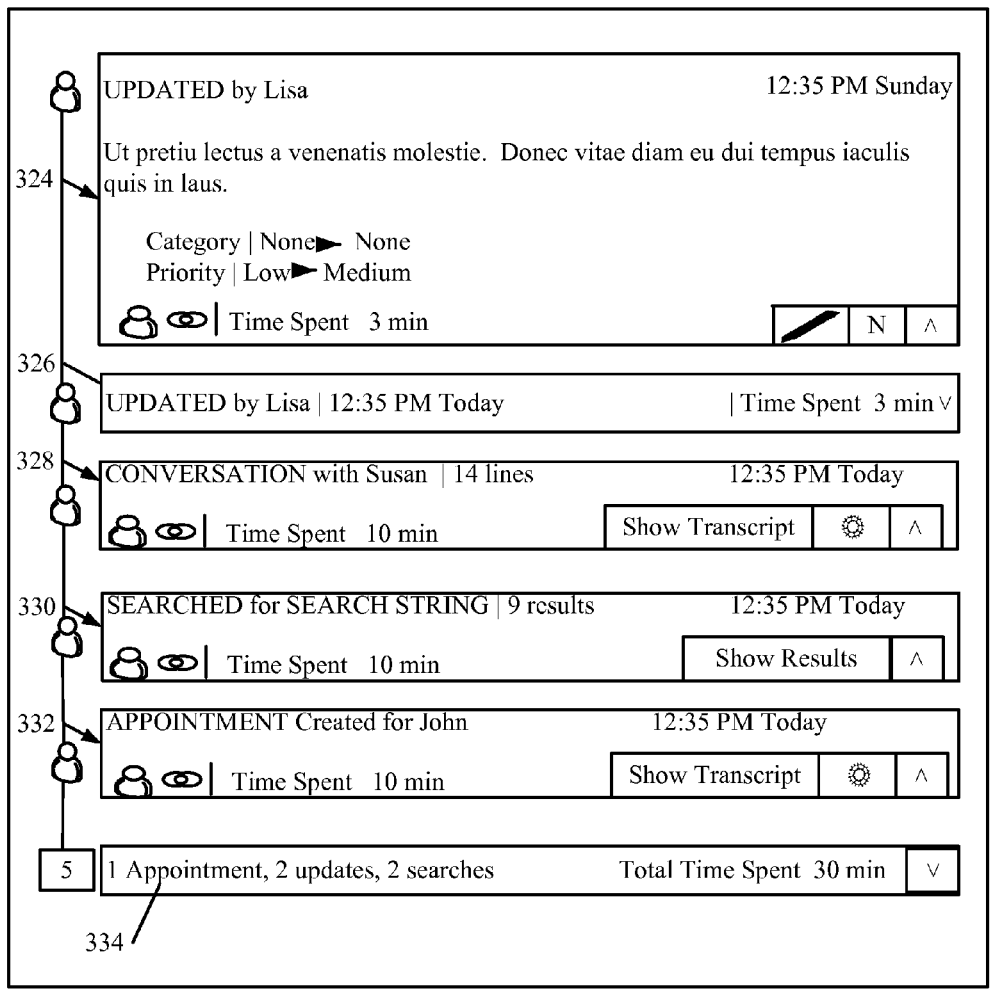
Figure 2D:
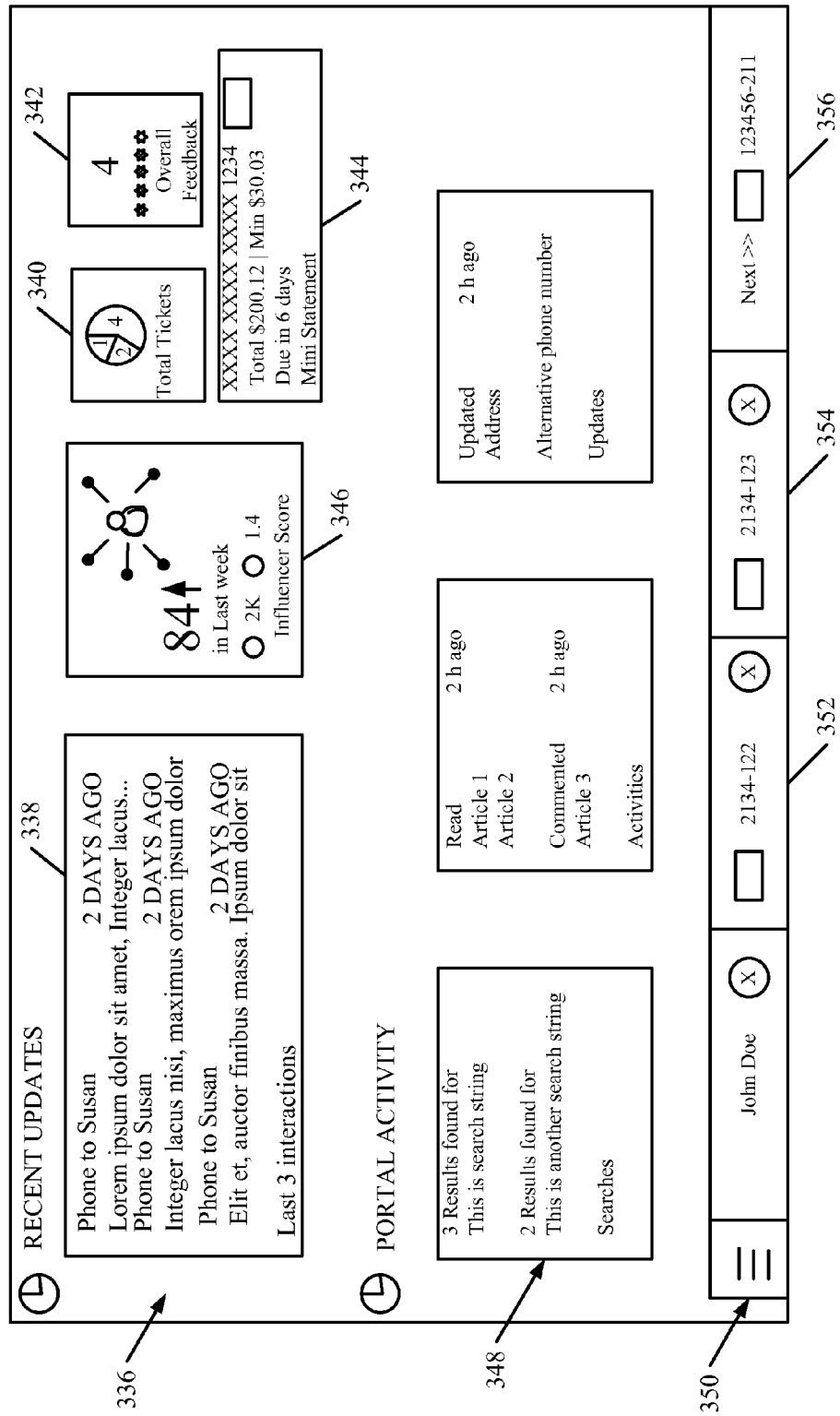

FIGS. 2B-2D show one example of a set of chronological map information 146 (e.g., a populated chronological display structure 144), in more detail. FIGS. 2B-2D are split into separate Figures but show an example of a single chronological display structure that may be vertically scrollable. It can be seen that chronological map information 146 includes customer identifying information 220 as well as a case number or ticket number 222. It also illustratively includes a title or issue identifier 310 that identifies an issue for which the chronological display structure has been populated. The display shown in FIGS. 2B-2D also illustratively include a set of line items 312, each of which may generally have the form shown in FIG. 2A, or a different form. It can be seen that each of the line items can correspond to a wide variety of different types of activities.

Line item 314, for instance, reflects the fact that the state of an issue has been changed to "resolved". Line item 316 illustratively corresponds to an activity in which a ticket (or case) has been generated relative to a computing system issue. Line item 318 includes indicator 320 that indicates that a ticket has been created and assigned by computing system 102 (e.g., by a customer service application 136 run by application component 118 in computing system 102). It illustratively identifies the computing system rule 322 that was used to generate the ticket. Line item 324 corresponds to an activity in which metadata for an issue has been updated (e.g., the priority of the issue has been updated from "low" to "medium"). Line item 326 shows one example in which the metadata update (also illustrated by line item 324) has been collapsed. Line item 328 corresponds to an activity in which a chat conversation occurred. Line item 330 corresponds to an activity in which a user conducted a search. Line item 332 corresponds to an activity in which an appointment was created. Line item 334 corresponds to a set of activities that have been collapsed together. The set of activities corresponding to line item 334 include one appointment, two updates, and two searches. It will be appreciated that these are only examples of line items.

The chronological display structure illustrated in FIGS. 2B-2D also illustratively includes recent update section 336. It includes a set of recent updates 338 which can be added to a recent update queue and displayed when the chronological display structure is requested. It can also include a wide variety of different types of metrics that can be calculated by summary generator 136 in visualization system 124 (in FIG. 1) when the chronological display structure is displayed. The metrics shown in FIG. 2D can be pre-computed or computed on-the-fly and can, for instance, include a total number of tickets 340, a feedback section 342, a receivables section 344, and a variety of other types of scores or metric information 346.

In addition, the chronological display structure can include a portal activity section 348. Section 348 illustratively identifies recent activities or web portal interactions that occurred just prior to creation of the customer issue ticket represented by the chronological display structure shown in FIGS. 2B-2D. For instance, it indicates that a plurality of different searches were performed through the portal. It indicates that a set of articles were read, and commented, and that a user's address or phone number was updated.

FIG. 2D also illustrates that the chronological display structure can have a set of multi-issue display mechanisms 350. Mechanisms 350 show that a plurality of different customer issues can be represented by tabs 352, 354 and 356. Therefore, a user can navigate to other chronological display structures, corresponding to other customer issues, by simply actuating the user input mechanisms (or tabs) 352-356. This gives the user the ability to work with multiple customers at the same time, thereby facilitating appropriate context isolation while multi-tasking in a high pressure and a time-constrained environment.

Figure 3A:
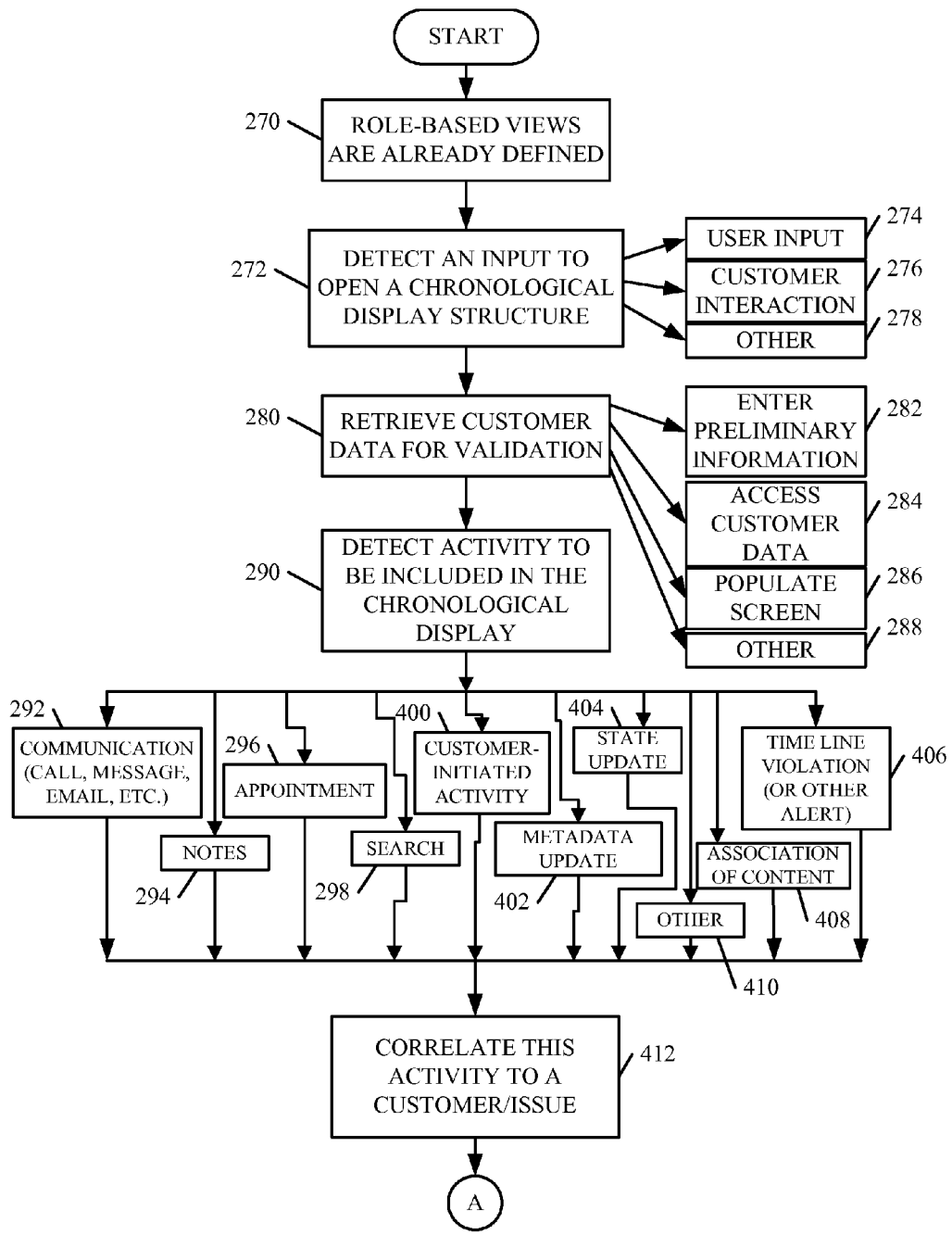
FIGS. 3A-3B (collectively referred to herein as FIG. 3) show a flow diagram illustrating one example of the operation of the architecture shown in FIG. 1 in surfacing a chronological information display.
Figure 3B:
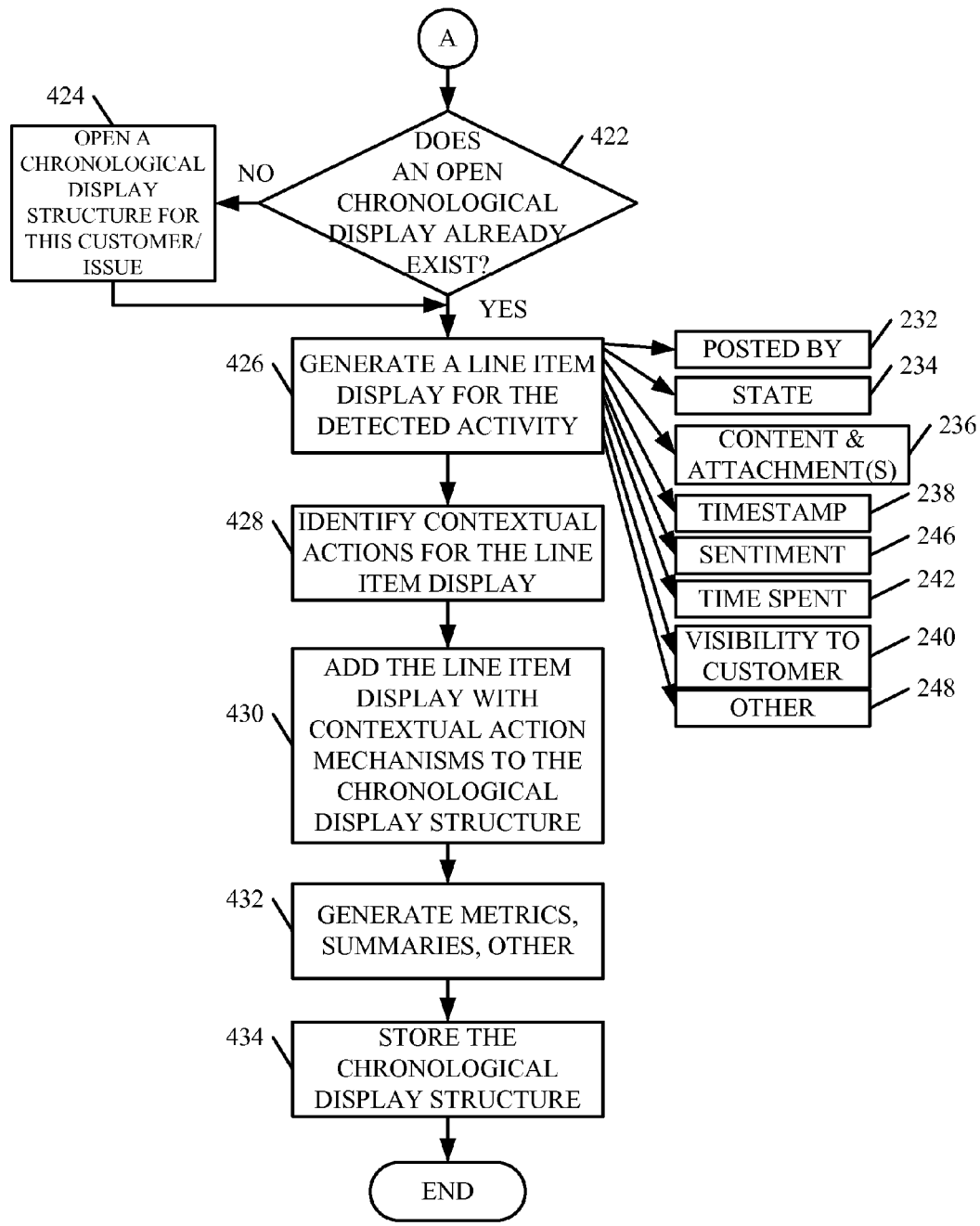

FIGS. 3A and 3B (collectively referred to herein as FIG. 3) show a flow diagram illustrating the operation of architecture 100 in opening a chronological display structure and populating it with information for a new issue. It is first assumed that the different role-based views of the chronological information have already been defined by an administrative user. This is indicated by block 270. For instance, timeline structure configuration system 130 can illustratively display configuration user input mechanisms that can be actuated by a user (such as an administrative user) to configure a timeline display structure. The user input mechanisms can, for instance, allow the user to select which type of activities are to be included in the timeline display structure. It can also identify which different types of roles are to view any given timeline display structure. By way of example, an engineer may wish to have certain technical activities and technical information included in his or her timeline display structure. However, a manager may wish to have progress information or other types of information included in the timeline display structure. Therefore, during configuration, the user that is configuring a timeline display structure can identify this.

The user configuring the structure can also indicate that the role-specific view will incorporate role-specific privileges. For instance, a line item may have different read/write/update access for different roles. An external user 114, for instance, may be able to view a line item, but not change the status of the line item. Further, a user with a given role may not have access to certain information in the chronological display structure. When that user, with that particular role, accesses the chronological display structure, the information may be collapsed or hidden. However, when a user with a different role (who has access to the information) views the chronological display structure, then the information will be expanded so that the latter user has access to all of the information regarding the issue represented by the chronological display structure. In any case, for purposes of the present discussion, it is assumed at block 270 that the various chronological display structures have already been configured or defined.

Once the chronological display structures have been defined, system 102 can then detect an input indicative of a desire to open a chronological display structure. This is indicated by block 272. For instance, a customer service user may receive a call from a customer indicating a new issue. The customer service user may then provide an input indicating that the user wishes to open a chronological display structure for the new issue. Detecting a user input is indicated by block 274. Alternatively, a customer may call or send an email, or comment on a company's website, indicating that the customer has an issue. Detecting a customer interaction is indicated by block 276. Detecting an input to open a new chronological display structure can be done in other ways as well, and this is indicated by block 278.

Customer data import component 176 then retrieves customer data for validation by the user who is opening the chronological display structure for the new customer issue. This is indicated by block 280. This can be done by having the user enter preliminary information (such as the customer name, etc.). This is indicated by block 282. The import component 176 can then access a wide variety of different types of customer data in data store 122, as indicated by block 284. Import component 176 then populates the chronological display structure that has been opened by the user and displays the customer data to the user for validation. This is indicated by block 286. The customer data can be retrieved for validation in other ways as well, and this is indicated by block 288.

Once the chronological display structure has been opened and populated with data for a customer issue, then activity detector 131 can detect a wide variety of different types of activities that are to be included in the chronological display structure. Detecting an activity to be included is indicated by block 290. The detected activities can be a communication 292, which can be internal communication within the organization using computing system 102, or it can be a communication with an external user (e.g., a customer). The communication can take a wide variety of different forms, such as a call, a message, an email, etc. The detected activity can be that a user has entered notes with respect to the issue represented by the chronological display structure. This is indicated by block 294. It can be that an appointment has been scheduled as indicated by block 296 or that a search was performed for relevant information, as indicated by block 298. It can be a customer-initiated activity (such as an email, a post on a website, etc.) as indicated by block 400. It can be a metadata update (such as changing the priority of an issue from low to medium, etc.). This is indicated by block 402. It can be a state update (such as by changing the status of the issue from open or active to "resolved"). This is indicated by block 404. The activity can be a timeline violation or other alert (such as when a customer service representative promises a customer that an issue will be resolved or a delivery will be made by a given date, and that date has passed). A timeline violation or other alert is indicated by block 406. It can be an association of content with an issue (such as providing a link to a document, a video, or other content). This is indicated by block 408. The activity can take a wide variety of other forms as well, and this is indicated by block 410.

After activity detector 131 detects the activity, issue correlation component 132 illustratively correlates the detected activity with an issue, a customer, a chronological display structure, etc. This is indicated by block 412. This can be done in a variety of different ways. For instance, if the activity is a communication (such as an email, a call, a message, etc.) then correlation component 132 illustratively accesses header information 414 corresponding to the detected activity. The header information may identify the customer, a case number, or have a variety of other identifying information that can be used to correlate the activity. The activity may have a "regarding" object or field 416 that also indicates identifying information that may be used to correlate the activity. For instance, a customer may include a case number in the "regarding" object. This can be used to correlate the activity to an issue, a customer, a chronological display structure, etc. The case number 418 can be identified in other ways, or other information 420 can be used to correlate the activity.

Correlation component 132 also determines whether a chronological display structure has already been opened for this issue, customer, etc. This is indicated by block 422. If not, then it opens a new chronological display structure for this customer/issue, etc. This is indicated by block 424. In either case, once a chronological display structure is opened, line item generator 129 generates a line item display element for the detected activity. This is indicated by block 426. As discussed with respect to the previous figures, the line item display element can include a "posted by" identifier 232, a state identifier 234, content and attachments 236, 244, a timestamp 238, a sentiment identifier 246, a time spent indicator 242, a visibility identifier 240, and a wide variety of other information 248.

Contextual action identifier 178 also illustratively identifies contextual actions that may be taken in the context of the activity represented by the line item display element that was just created. Identifying the appropriate contextual actions is indicated by block 428. View generator 174 adds the line item display with the contextual action mechanisms to the chronological display structure that has been opened. This is indicated by block 430.

Summary generator 146 can then generate the various metrics, summaries, recently updated lists, etc., and those can also be added to the chronological display structure. This is indicated by block 432. All of this information can then be stored in data store 122, or elsewhere, for access by the users. This is indicated by block 434.

Figure 4:
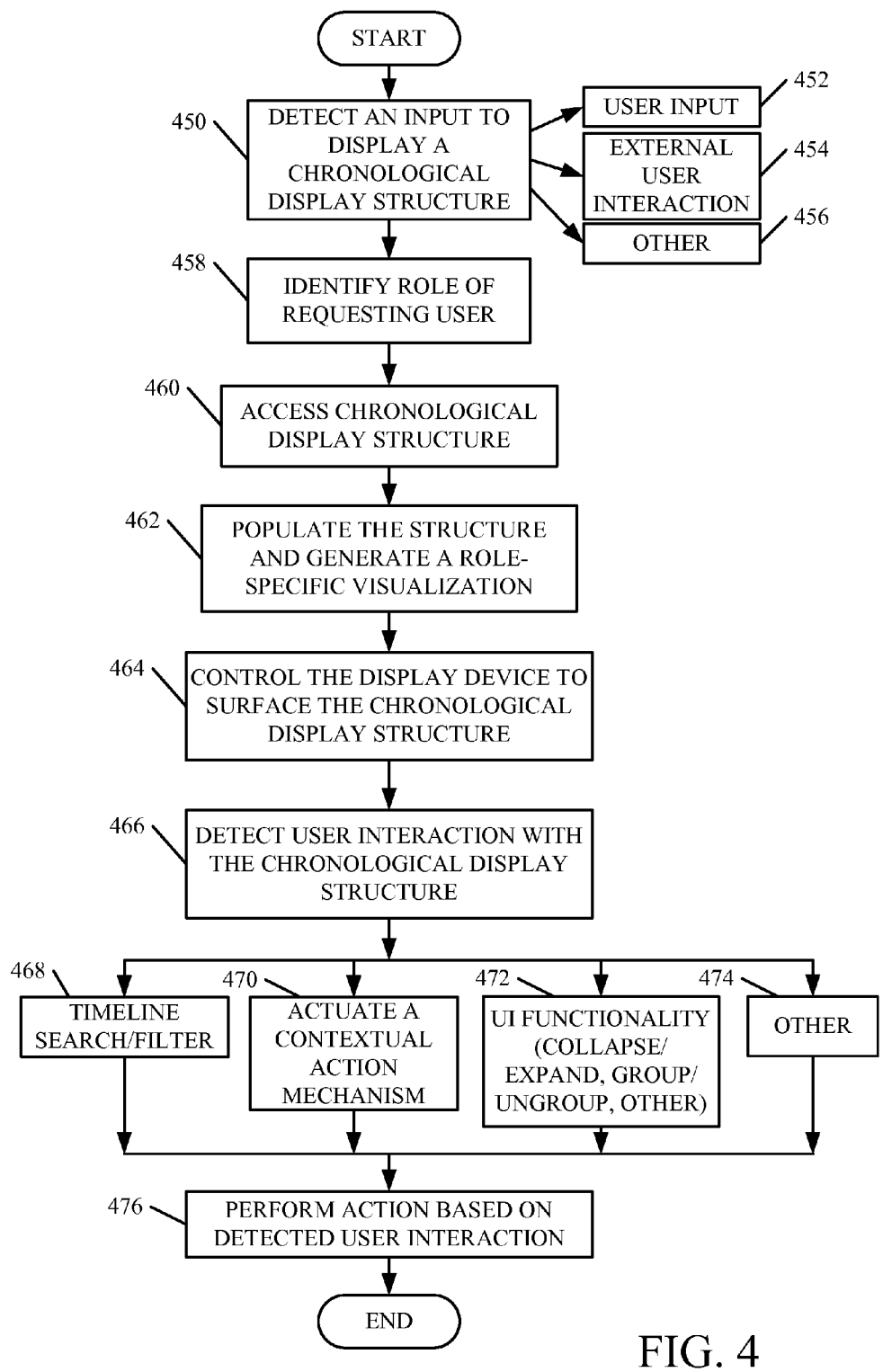
FIG. 4 is a flow diagram illustrating one example of the operation of the architecture shown in FIG. 1, showing runtime interaction with a chronological display structure.

It may be that, when the chronological display structure is opened and populated, it is simultaneously displayed to a user for user interaction. It may also be, however, that the chronological display structure is stored and accessed later by a user. In either case, visualization system 124 illustratively generates a role-specific visualization of the chronological display structure for the user. FIG. 4 illustrates one example of the operation of visualization system 124 in surfacing a visualization of the chronological display structure for user interaction.

Visualization system 124 first detects an input to display a chronological display structure. This is indicated by block 450. Again, this can be a user input 452, an external user interaction 454, or a wide variety of other inputs 456. Role identifier 172 then identifies the role of the requesting user. This is indicated by block 458. This can be done in a variety of different ways. For instance, when the user logs in to computing system 102 (or otherwise provides authentication information), that information can identify the user's role. In another example, the identifying information can be used to access user profile information which identifies the user's role. Other ways of identifying the user's role can be performed as well. View generator 174 then accesses the chronological display structure that has been requested by the user. This is indicated by block 460. Customer data import component 176 then populates the structure (if it is not stored in a populated fashion) and generates a role-specific visualization. This is indicated by block 462. For instance, view generator 174 can collapse information or remove or hide information on the chronological display structure that the user does not have access to. It can also enforce access rights. For instance, the user may have read only access to certain line items and read/write/update access to other line items.

Chronological display generator 178 then uses user interface component 120 to control display device 106 to surface the chronological display structure on display device 106, for user interaction. This is indicated by block 464.

Visualization system 124 then detects any user interactions with the chronological display structure. This is indicated by block 466. For instance, the timeline display may be quite lengthy (e.g., 30-50 line items, or more). Therefore, timeline search/filter system 182 can display search or filter user input mechanisms that allow the user to search or filter the chronological display structure. Such user input mechanisms can include a search box that allows the user to search for keywords or other textual inputs. It can include other input mechanisms that allow the user to filter the chronological display structure based on activity type, line item recency, or a wide variety of other filter criteria. As more examples, the search or filter user input mechanism can allow the user to filter to show activities only, system updates only, recent updates, the current user's actions, actions of the current user's team, customer responses, alerts or violations, manager responses, etc. The user input mechanism can also allow the user to apply multiple filters or search criteria. Detecting a user search or filter interaction is indicated by block 468.

The detected user interactions can also be that the user has actuated a contextual action mechanism. This is indicated by block 470. Further, they can be that the user has provided an input to perform UI functionality. Such functionality can be, for instance, to collapse certain line items or expand them, to group or ungroup line items, or a wide variety of other UI functionality. This is indicated by block 472. The detected user interaction can take a wide variety of other forms as well. This is indicated by block 474.

In response, visualization system 124 performs various actions based upon the detected user interaction. This is indicated by block 476. For instance, if the user provides a timeline search/filter input, then timeline search/filter system 182 illustratively filters the line items or other items on the chronological display structure based on the search or filter inputs. If the user actuates a contextual action mechanism, then the application component 118 performs the contextual action based on the detected user interaction. If the user actuates user interface mechanisms to perform UI functionality, then UI capability component 180 performs the UI functionality based upon the detected user interaction. Of course, these are examples only.

Figure 5A:
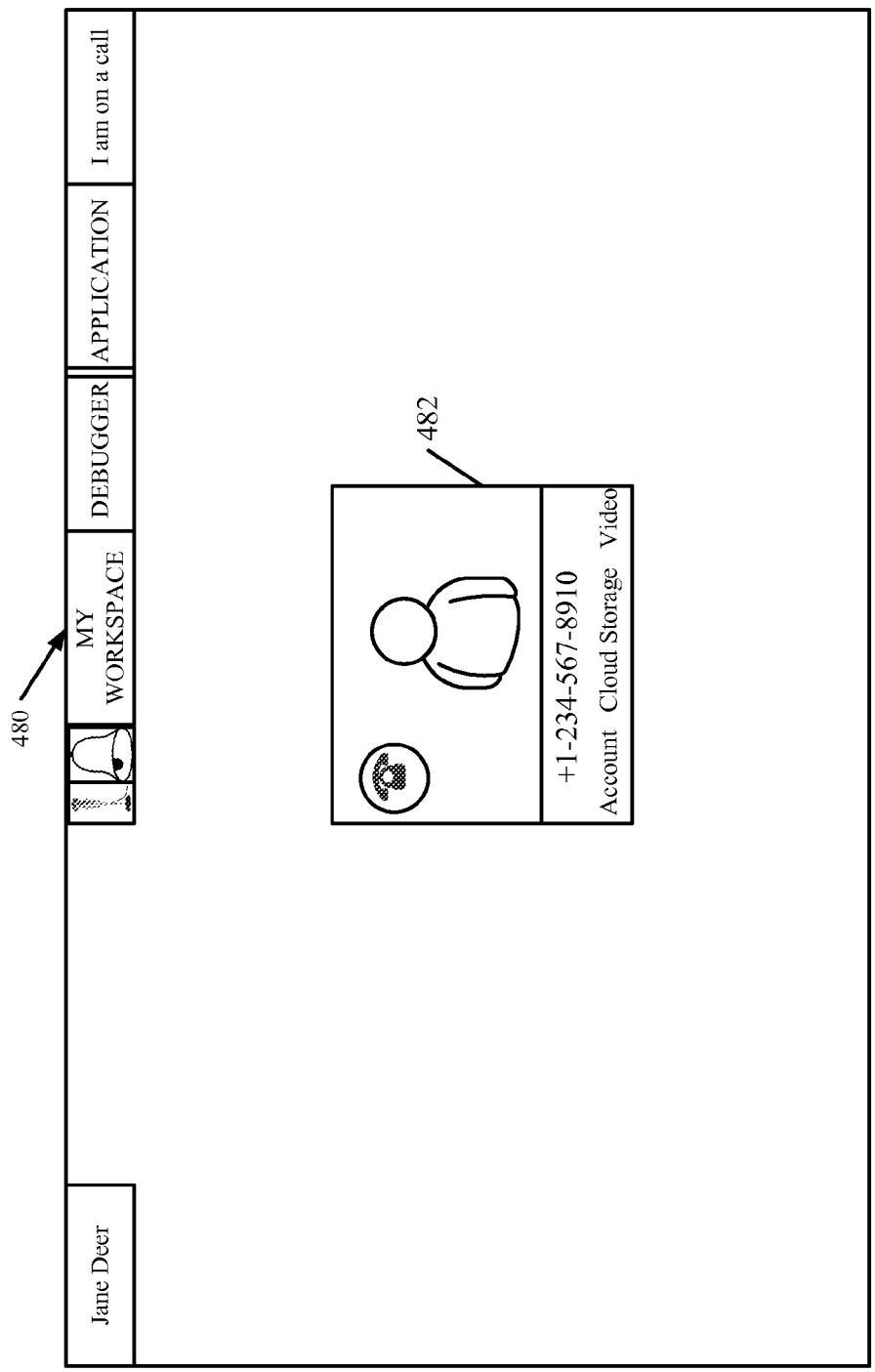
FIGS. 5A-5G show examples of user interface displays that can be generated, during runtime, in identifying items to be added to a chronological display structure and in surfacing that structure for user interaction.
Figure 5B:
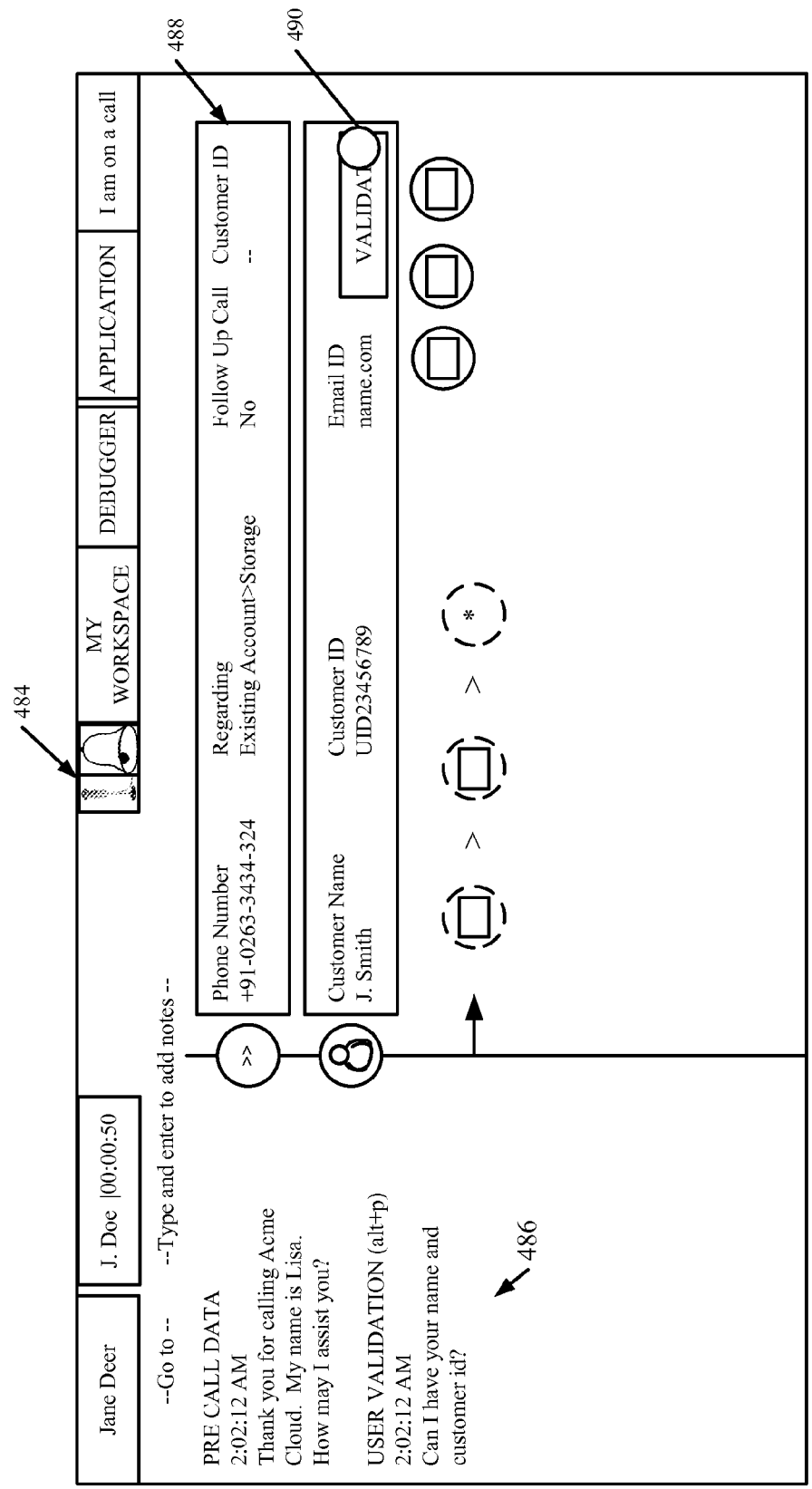

FIGS. 5A-5G show a set of user interface displays that illustrate one example of the operation of computing system 102 in generating a chronological display structure, during runtime. FIG. 5A illustrates a user interface display 480 that shows that an external user is calling. For instance, this may indicate that there is an incoming customer request. This is indicated by display element 482. A similar display can be generated for customer interaction over other channels, such as chat requests, emails, social network communications, etc. A user 110 can illustratively answer the call by actuating display element 482 or otherwise. When this happens, visualization system 124 illustratively generates a user interface display, such as display 484 shown in FIG. 5B. It can display a recommended script 486, and it can also automatically capture (or allow the user to enter) preliminary information, such as the caller's telephone number, the caller's name, or a wide variety of other information 488. When that happens, customer data import component 176 illustratively accesses data store 122 and imports customer identification data and displays validate user input mechanism 490 so that the user can validate whether the data is correct.

Figure 5C:
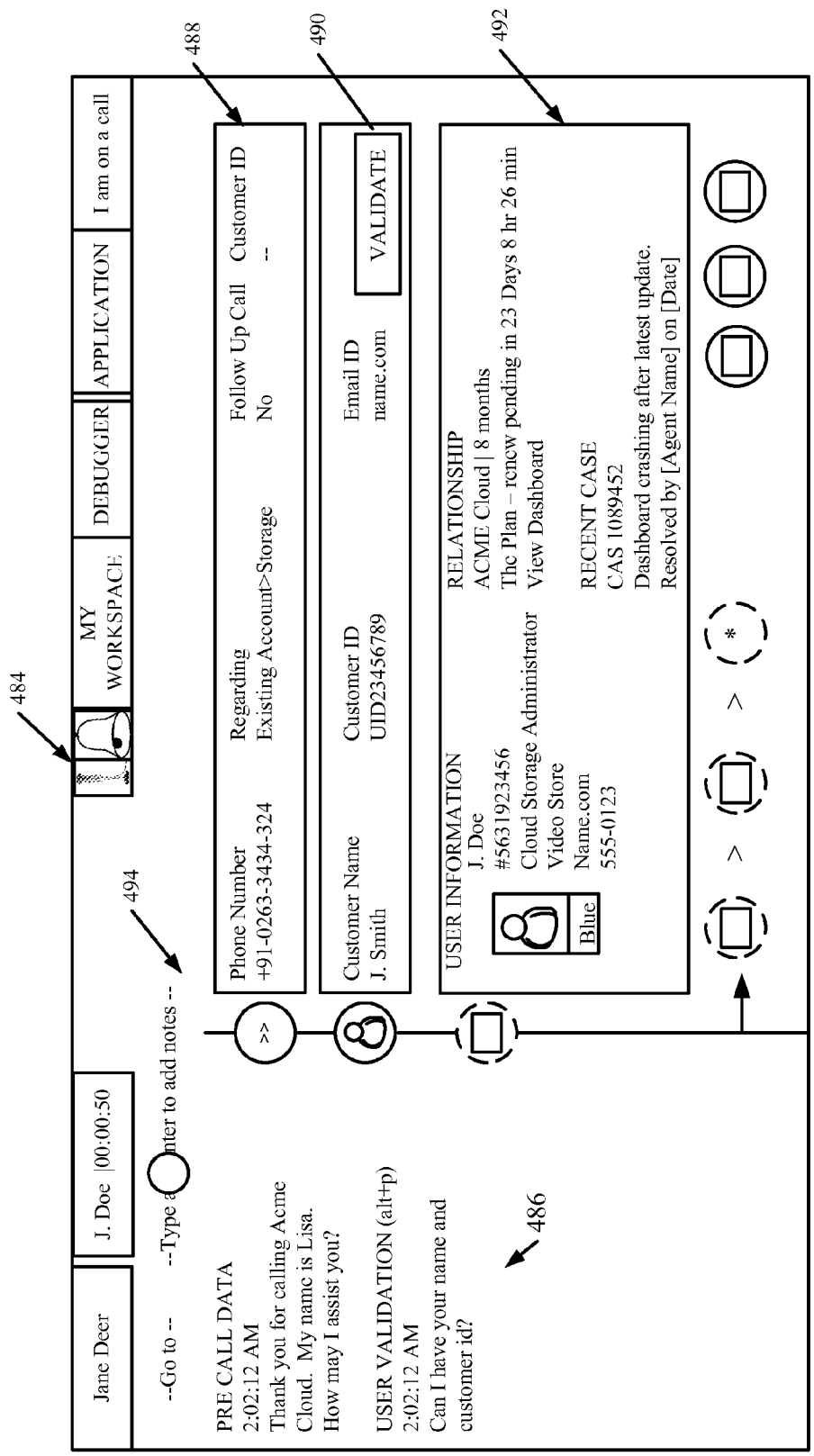

When the user validates the data by actuating mechanism 490, FIG. 5C shows that the additional customer information 492 can be displayed for user 110. The chronological display structure can now be populated with line items.

Figure 5D:
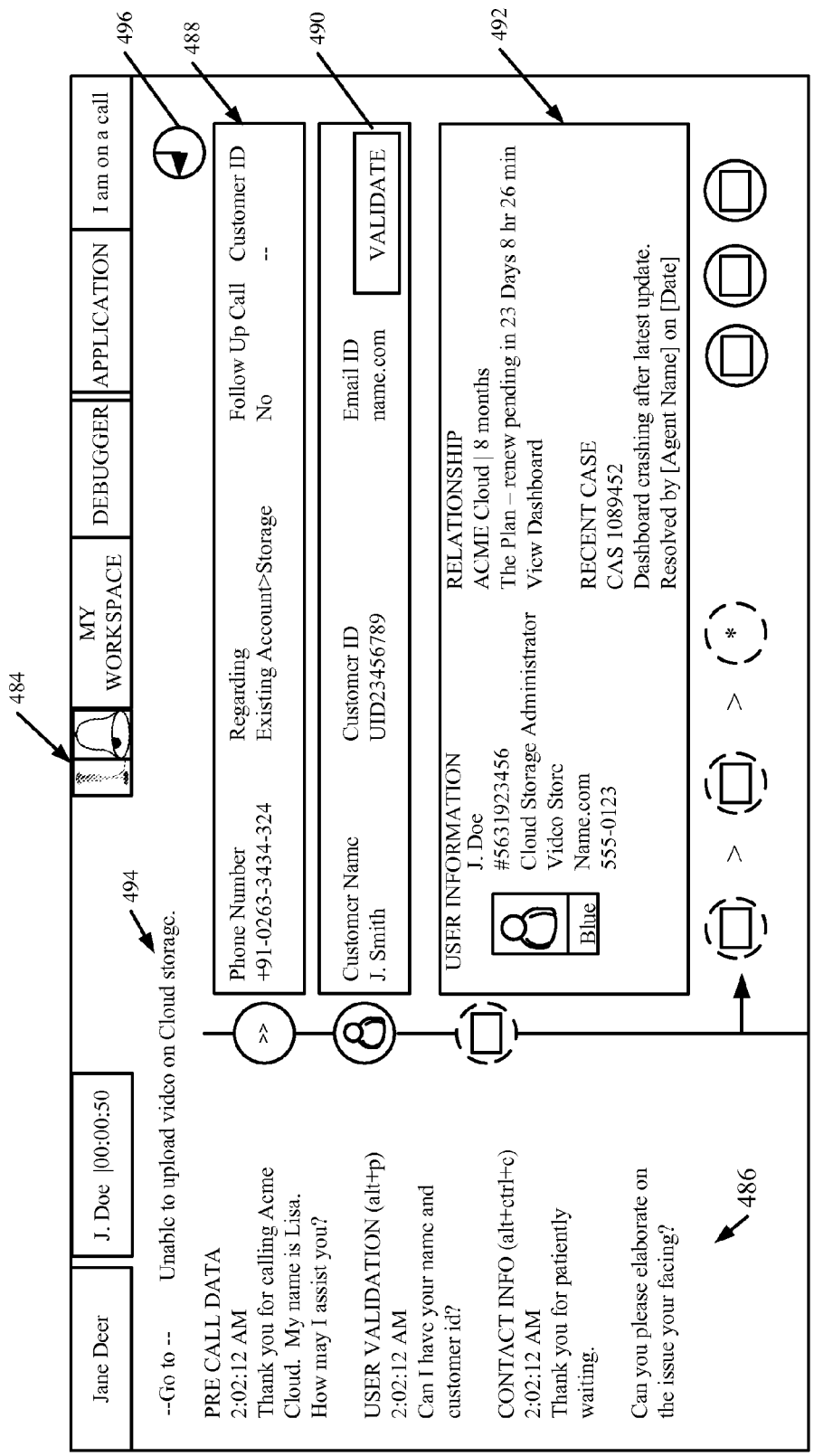

In the example shown in FIG. 5C, it can be seen that the user is actuating a notes user input mechanism 494 that can be used to enter notes on the chronological display structure. FIG. 5D shows that the user has entered the notes "unable to upload video on cloud storage" in notes user input mechanism 494. The user can confirm this by actuating an enter user input mechanism 496. When this happens, a line item 498 is generated that reflects the activity of the user entering notes. This is illustrated in FIG. 5E.

Figure 5E:
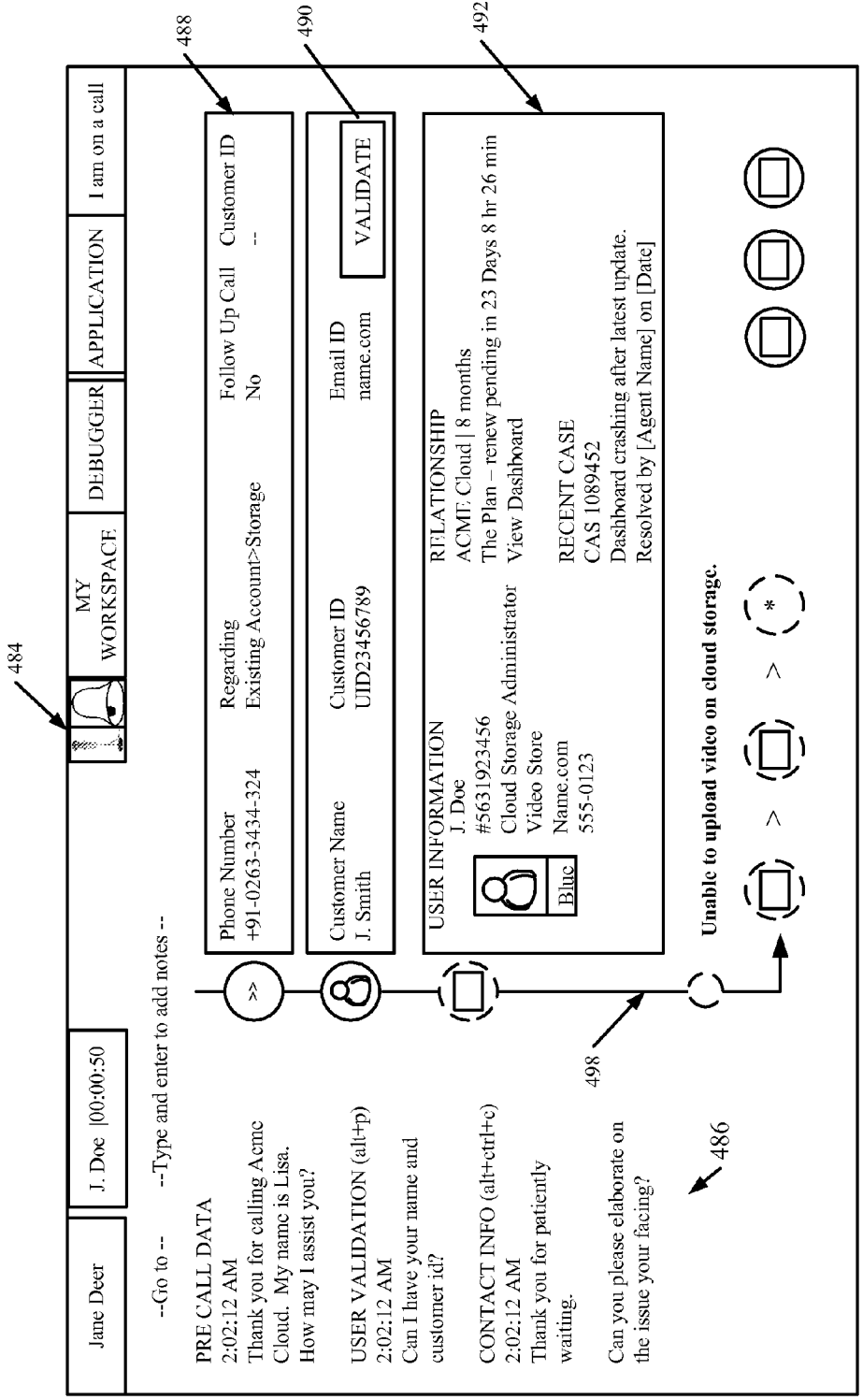
Figure 5F:
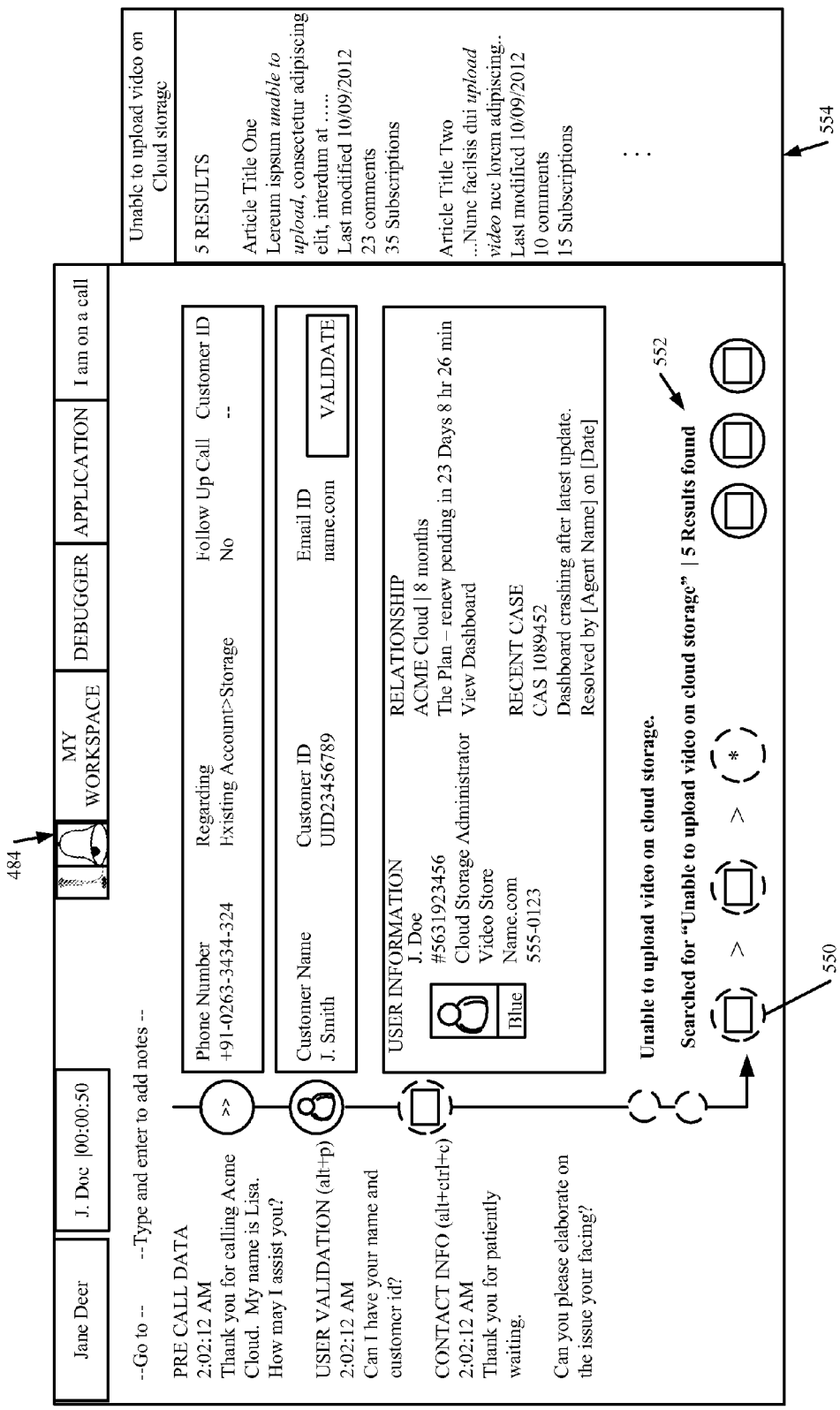
Figure 5G:
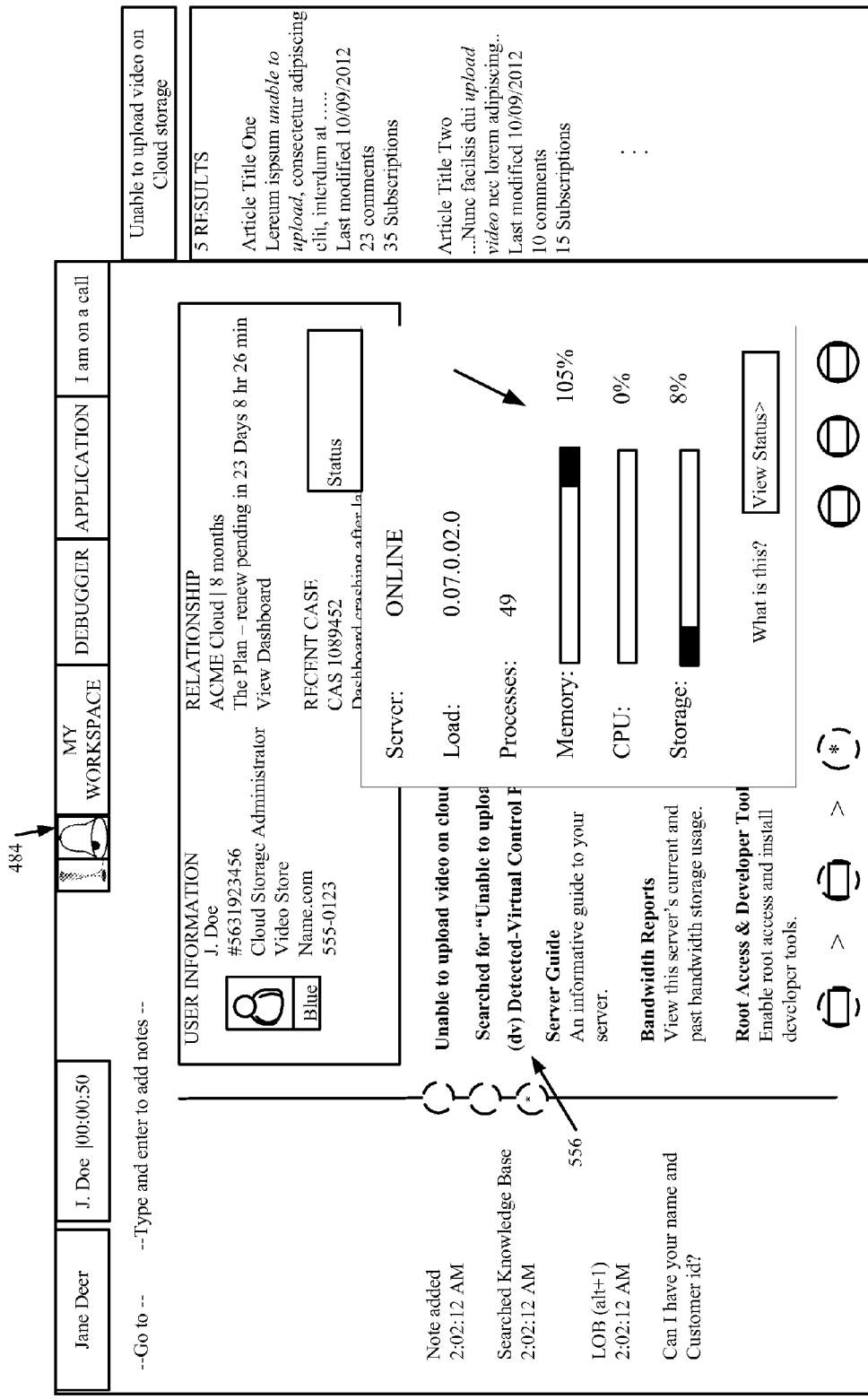

FIG. 5E also shows that the user is now actuating a contextual input mechanism 550 which allows the user to perform a search for related content (e.g., articles, etc.) that can be used to address the customer issue of being "unable to upload video on cloud storage." FIG. 5F shows that another line item 552 has been created to reflect the activity of the user performing a search. User interface display 484 also illustratively includes a search results display section 554 that displays search results for the search conducted by the user. FIG. 5G now shows that a line item 556 has been generated to indicate that the user has opened one of the search results displayed in section 554. The content of the article can be displayed in line item 556, or a link to the content can be displayed, or a wide variety of other information can be displayed.

It will be appreciated that FIGS. 5A-5G show only one example of how a chronological display structure can be opened and populated with a relatively small number of line items, reflecting a relatively small number of activities. It will be appreciated, however, that a wide variety of different types of activities can be detected and included in the display structure, and they can be detected and included over a long period of time, from a wide variety of sources, communication channels, etc. Therefore, a user who later accesses the display structure can see precisely what happened, when, how recently, etc.

It can thus be seen that the present system advantageously aggregates information that is correlated to a given issue, customer, etc., from a wide variety of different channels or sources. The information can be from a variety of different communication systems, from a variety of different applications, from a variety of different data sources, etc. The information that is relevant to a given role is illustratively aggregated from all of those different channels or systems, and presented in a chronological fashion. The data that may be relevant to a user having one role is presented for that role, while different data, that may be relevant to user having a second role, is surfaced for the user having the second role. This improves the processing of the computing system, itself, in that it reduces the processing overhead needed for navigating, searching, and rendering of the information. Whereas, in prior systems, a user may need to search multiple different data stores storing information for multiple different channels or systems, and then navigate to those different data stores to view all of this type of information, the present system aggregates it and surfaces it in a single view. This can significantly reduce network traffic, search and navigation processing overhead, and rendering overhead.

It also illustratively increases the efficiency of the users. They need not search multiple different locations in order to find information relevant to a given issue and attempt to piece that information together, themselves, chronologically, to determine when activities took place relative to one another. Instead, the present system advantageously generates a chronological display structure and selectively includes or excludes detected activities, based upon the underlying configuration of the structure, for surfacing.

The present system also advantageously includes contextual user input mechanisms, with each line item generated, so that a user can directly take action from the chronological display structure, within the context of each line item. The contextual actions can be based on the type of the line item they're associated with, what or who performed the activity represented by the line item, based on a current state of the line item, etc.

The present system also advantageously allows the user to quickly and easily filter and search through the display structure by applying multiple filters, by using keywords, ownership, date, customer initiation, etc. as filter criteria. The present system also illustratively and advantageously applies permissions and access rights to the various information in the chronological display structure. Thus, the security of the information is maintained.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
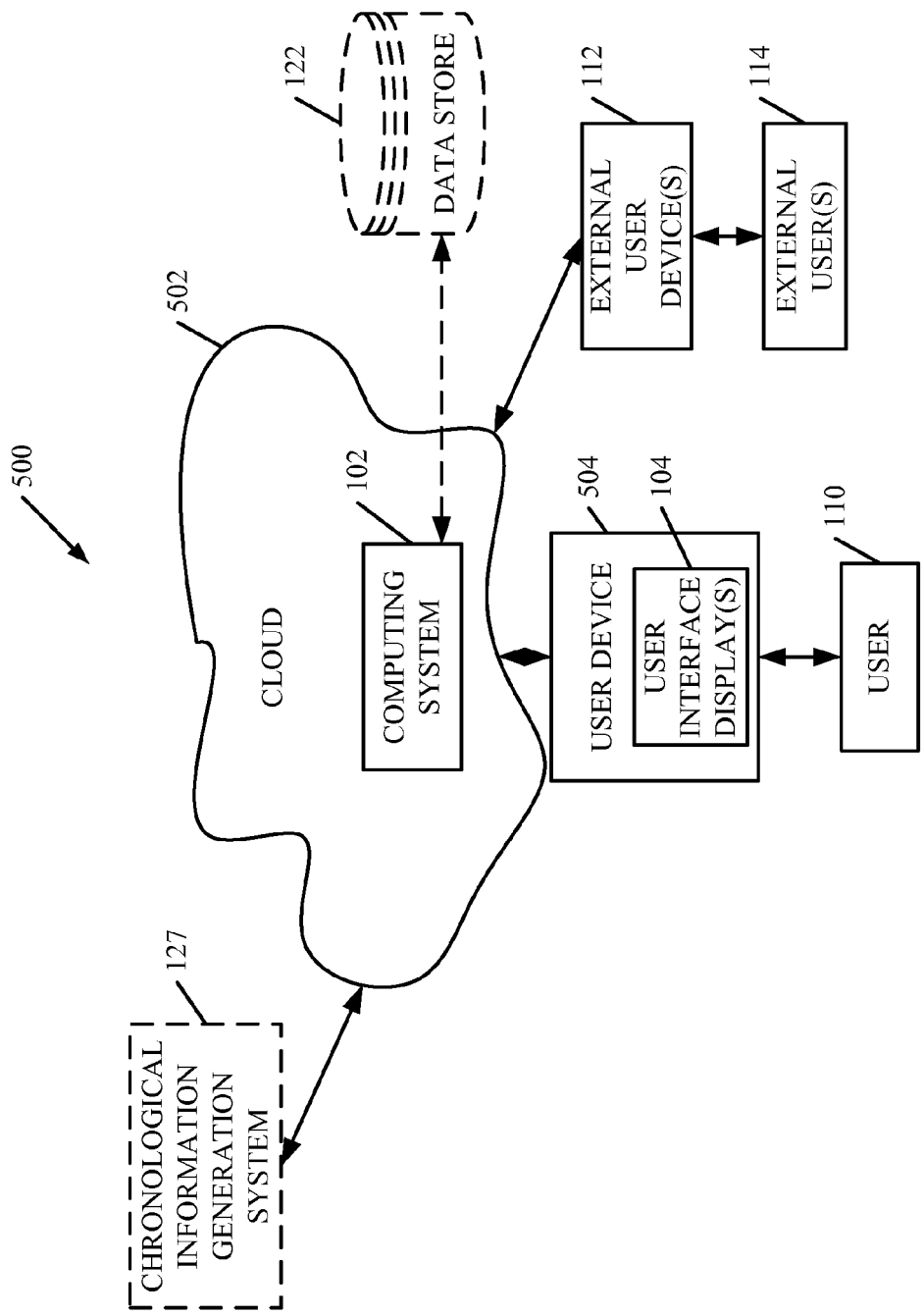
FIG. 6 is a block diagram of one example of the architecture shown in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing system 102 can be located in cloud 502 (which can be public, private, or a combination where portions are public while others are private). Therefore, user 110 uses a user device 504 to access those systems through cloud 502.

FIG. 6 also depicts another example of a cloud architecture. FIG. 6 shows that it is also contemplated that some elements of computing system 102 can be disposed in cloud 502 while others are not. By way of example, data store 122 can be disposed outside of cloud 502, and accessed through cloud 502. In another example, chronological information generation system 127 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
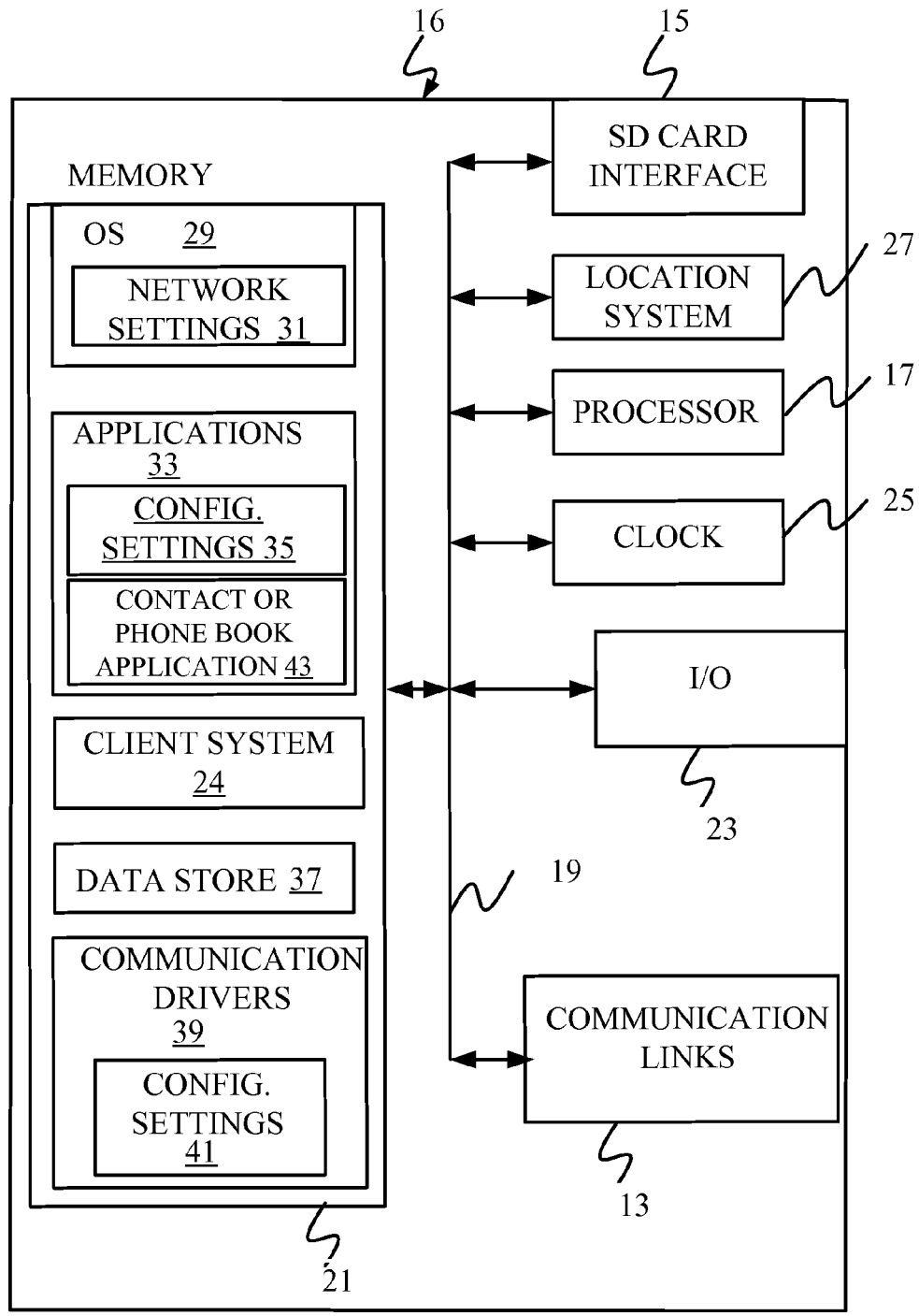
FIGS. 7-9 show examples of mobile devices, that can be used in the architectures shown in previous figures.
Figure 8:
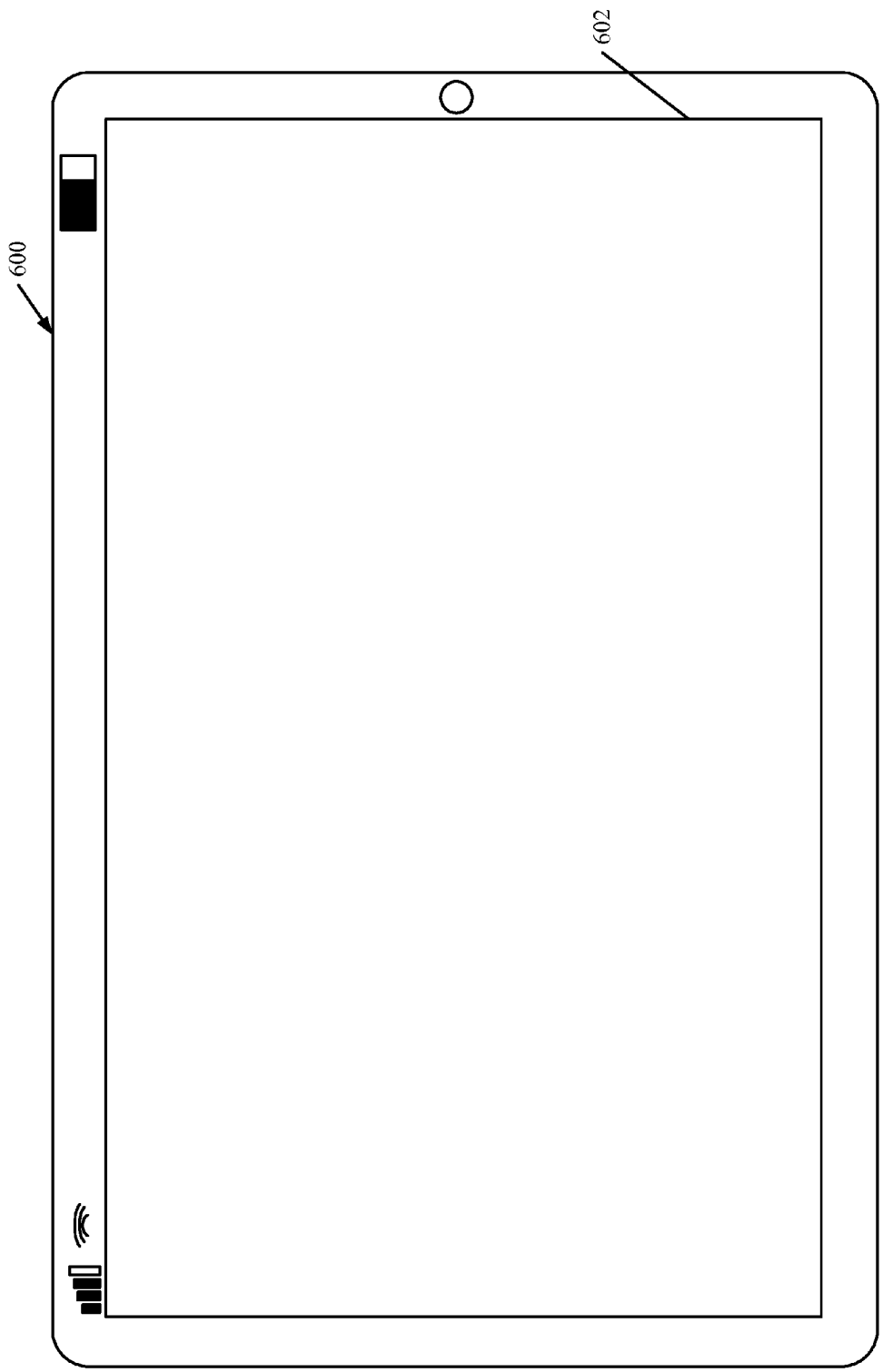
Figure 9:
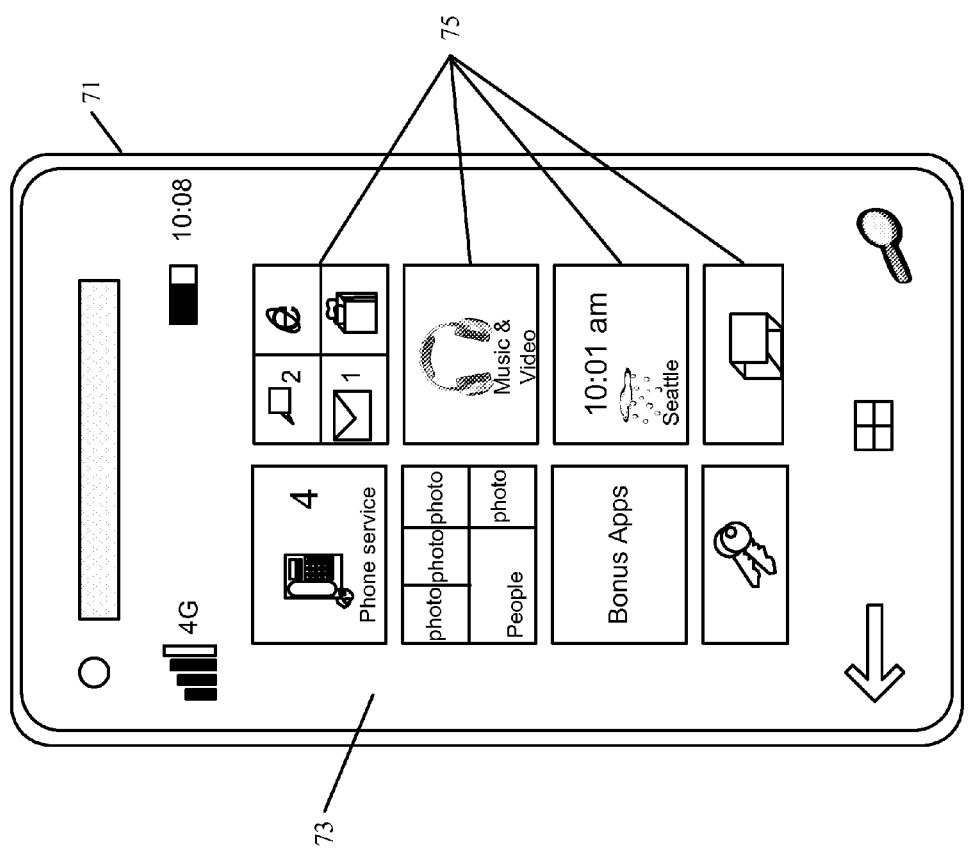

FIG. 7 is a simplified block diagram of one illustrative embodiment of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems (like on-premise business application 176) are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 9 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
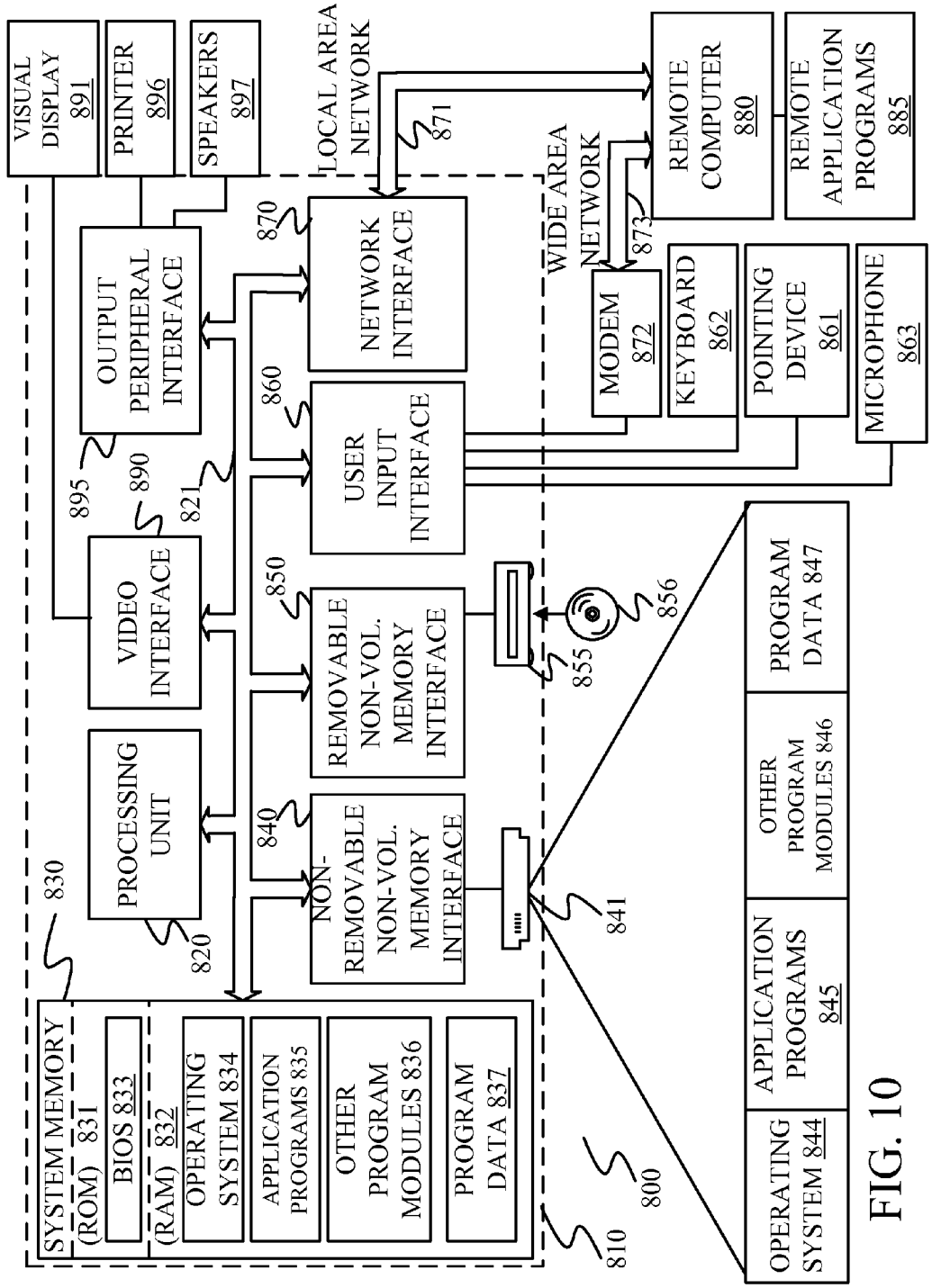
FIG. 10 is a block diagram of one example of a computing environment that can be used in the architectures shown in previous figures.

FIG. 10 is one embodiment of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface component;

a chronological information aggregation system that detects related activities on a plurality of different channels and generates corresponding display elements and stores the display elements in a chronological display structure; and a visualization system that detects a user display interaction indicative of a user request to display the chronological display structure and that controls the user interface component to surface the chronological display structure, with the display elements corresponding to the detected activities, for user interaction.

Example 2 is the computing system of any or all previous examples wherein the chronological information aggregation system comprises:
a timeline structure configuration system that generates user configuration mechanisms that are actuated to configure the chronological display structure to include display elements corresponding to an identified set of activities having different activity types.

Example 3 is the computing system of any or all previous examples wherein the chronological information aggregation system comprises:
an activity detector component that detects activities of the types in the set of activities; and
an activity correlation component that correlates the detected activities relative to one another to identify the related activities.

Example 4 is the computing system of any or all previous examples wherein the chronological information aggregation system comprises:
a line item generator component that generates a line item display element corresponding to each related activity as the corresponding display elements.

Example 5 is the computing system of any or all previous examples wherein the chronological information aggregation system comprises:
a contextual action identifier component that identifies a set of contextual actions for each line item display element and generates a contextual action user input mechanism for each contextual action in the set of contextual actions identified for each line item display element.

Example 6 is the computing system of any or all previous examples wherein the visualization component displays the line item display elements with the contextual action user input mechanisms, in a chronological order based on at least one of a time when each line item display element is created and a time when the corresponding related activity is detected.

Example 7 is the computing system of any or all previous examples wherein the visualization system comprises:
a chronological display generator that identifies a user role of a user generating the user request and that generates a role-based visualization of the chronological display structure in response to the user request.

Example 8 is the computing system of any or all previous examples wherein the visualization system comprises:
a timeline search/filter system that displays search/filter user input mechanisms and detects user actuation of the search/filter user input mechanisms and, in response, generates a visualization of the chronological display structure based on the detected actuation.

Example 9 is the computing system of any or all previous examples wherein the visualization system comprises:
a user interface (UI) capability component that generates UI capability user input mechanisms and detects user actuation of the UI capability user input mechanisms and performs UI functions based on the detected actuation.

Example 10 is the computing system of any or all previous examples wherein the UI functions include collapse/expand functions for collapsing and expanding information in the surfaced chronological display structure and group/ungroup functionality for grouping and ungrouping line items in the surfaced chronological display structure.

Example 11 is the computing system of any or all previous examples wherein the activity detector detects activities from the plurality of different channels comprising a plurality of communication channels, a social network channel, an application channel and a scheduling system channel.

Example 12 is the computing system of any or all previous examples wherein the chronological display generator enforces role-based permissions in generating the role-based visualization.

Example 13 is a computer implemented method, comprising:

detecting related activities on a plurality of different channels;

generating corresponding display elements, corresponding to the detected activities;

storing the display elements in a chronological display structure; and detecting a user display interaction indicative of a user request to display the chronological display structure; and controlling a user interface component to surface the chronological display structure, with the display elements corresponding to the detected activities, for user interaction.

Example 14 is the computer implemented method of any or all previous examples and further comprising:

generating user configuration mechanisms that are actuated to configure the chronological display structure to include display elements corresponding to an identified set of activities having different activity types.

Example 15 is the computer implemented method of any or all previous examples wherein generating corresponding display elements comprises:

generating a line item display element corresponding to each related activity as the corresponding display elements.

Example 16 is the computer implemented method of any or all previous examples and further comprising:

identifying a set of contextual actions for each line item display element;

generating a contextual action user input mechanism for each contextual action in the set of contextual actions identified for each line item display element, wherein controlling the user interface component comprises displaying the line item display elements with the contextual action user input mechanisms, in a chronological order.

Example 17 is the computer implemented method of any or all previous examples wherein controlling the user interface component comprises:

identifying a user role of a user generating the user request; and generating a role-based visualization of the chronological display structure in response to the user request.

Example 18 is the computer implemented method of any or all previous examples wherein generating a role-based visualization comprises:

enforcing role-based permissions in generating the role-based visualization.

Example 19 is a computing system, comprising:

a user interface component;

an activity detector component that detects activities of given activity types on a plurality of different channels;

an activity correlation component that correlates the detected activities relative to one another to identify related activities;

a line item generator component that generates a line item display element corresponding to each related activity and stores the line item display elements corresponding to the related activities in a chronological display structure;

a contextual action identifier component that identifies a set of contextual actions for each line item display element and generates a contextual action user input mechanism for each contextual action in the set of contextual actions identified for each line item display element; and a visualization system that detects a user display interaction indicative of a user request to display the chronological display structure and that controls the user interface component to surface the chronological display structure, with the display elements corresponding to the detected activities, for user interaction, the visualization component displaying the line item display elements with the contextual action user input mechanisms, in a chronological order.

Example 20 is the computing system of any or all previous examples and further comprising:

a timeline structure configuration system that generates user configuration mechanisms that are actuated to configure the chronological display structure to include display elements corresponding to an identified set of activities having different activity types.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to provide:
a chronological information aggregation system configured to:
receive an indication of related activities associated with a plurality of different channels;
generate display elements that correspond to the related activities; and
store the representations of the display elements in a chronological display structure that defines chronological relationships between the display elements; and
a visualization system configured to:
in response to an indication of a display interaction indicative of a user request to display the chronological display structure,
retrieve the chronological display structure, and
populate the display elements in the chronological display structure with data associated with the user request; and
generate a representation of a user interface display that includes the chronological display structure, with the populated display elements corresponding to the related activities.

2. The computing system of claim 1 wherein the chronological information aggregation system comprises:
a timeline structure configuration system configured to:
generate a user configuration mechanism;

based on an indication of user actuation of the user configuration mechanism, configure the chronological display structure to include display elements corresponding to an identified set of activities having different activity types.

3. The computing system of claim 2 wherein the chronological information aggregation system comprises:
an activity detector component configured to detect activities of the types in the set of activities; and
an activity correlation component configured to correlate the detected activities relative to one another to identify the related activities.

4. The computing system of claim 3 wherein the chronological information aggregation system comprises:
a line item generator component configured to generate a line item display element corresponding to each related activity as the corresponding display elements.

5. The computing system of claim 4 wherein the chronological information aggregation system comprises:
a contextual action identifier component configured to identify a set of contextual actions for each line item display element and generate a contextual action user input mechanism for each contextual action in the set of contextual actions identified for each line item display element.

6. The computing system of claim 5 wherein the visualization system is configured to generate a representation of the user interface display having the line item display elements with the contextual action user input mechanism arranged, in a chronological order, based on at least one of a time when each line item display element is created and a time when the corresponding related activity is detected.

7. The computing system of claim 6 wherein the visualization system comprises:
a chronological display generator is configured to identify a user role of a user associated with the user request and to generate a role-based visualization of the chronological display structure in response to the user request.

8. The computing system of claim 7 wherein the visualization system comprises:
a timeline search/filter system configured to:
generate a search/filter user input mechanism; and
based on an indication of user actuation of the search/filter user input mechanisms, generate the representation of the user interface display that includes the chronological display structure.

9. The computing system of claim 8 wherein the visualization system comprises:
a user interface (UI) capability component configured to:
generate a UI capability user input mechanism; and
based on an indication of user actuation of the UI capability user input mechanism, perform a UI function.

10. The computing system of claim 9 wherein the UI function comprises at least one of:
a collapse/expand function for collapsing and expanding information in the chronological display structure, and
a group/ungroup function for grouping and ungrouping line items in the chronological display structure.

11. The computing system of claim 3 wherein the activity detector is configured to detect activities from the plurality of different channels comprising a plurality of communication channels, a social network channel, an application channel and a scheduling system channel.

12. The computing system of claim 7 wherein the chronological display generator is configured to enforce a role-based permission in generating the role-based visualization.

13. A computer implemented method, comprising:
receiving an indication of related activities associated with plurality of different channels;
generating corresponding display elements, corresponding to the related activities;
storing the representations of the display elements in a chronological display structure that defines chronological relationships between the display elements;
based on an indication of a user display interaction indicative of a user request to display the chronological display structure,
retrieving the chronological display structure, and
populating the display elements in the chronological display structure with data associated with the user request; and
generating a representation of a user interface display that includes the chronological display structure, with the populated display elements corresponding to the related activities.

14. The computer implemented method of claim 13 and further comprising:
generating a user configuration mechanism; and
based on an indication of user actuation of the user configuration mechanism, configure the chronological display structure to include display elements corresponding to an identified set of activities having different activity types.

15. The computer implemented method of claim 14 wherein generating corresponding display elements comprises:
generating a line item display element corresponding to each related activity as the corresponding display elements.

16. The computer implemented method of claim 15 and further comprising:
identifying a set of contextual actions for each line item display element;
generating a contextual action user input mechanism for each contextual action in the set of contextual actions identified for each line item display element, wherein the representation of a user interface display comprises the line item display elements with the contextual action user input mechanisms, in a chronological order.

17. The computer implemented method of claim 16 wherein generating a representation of a user interface display comprises:
identifying a user role of a user associated the user request; and
generating a representation of a role-based visualization of the chronological display structure in response to the user request.

18. The computer implemented method of claim 17 wherein generating a representation of a role-based visualization comprises:
enforcing a role-based permission in generating the role-based visualization.

19. A computing system, comprising:
a processor; and
memory storing instructions executable by the processor, wherein the instructions, when executed, configure the computing system to:
receive an indication of activities of given activity types on a plurality of different channels;
correlate the detected activities relative to one another to identify related activities;
generate a representation of a line item display element corresponding to each related activity;

store the representations of the line item display elements in a chronological display structure that defines chronological relationships between the line item display elements;
identify a set of contextual actions for each line item display element;
generate a contextual action user input mechanism for each contextual action in the set of contextual actions identified for each line item display element; and
in response to an indication of a user display interaction indicative of a user request to display the chronological display structure,
retrieve the chronological display structure; and
populate the line item display elements in the chronological display structure with data corresponding to the related activities; and
generate a representation of a user interface display that includes the chronological display structure, with the populated line item display elements and the contextual action user input mechanisms, in a chronological order.

20. The computing system of claim 19, further comprising:
a timeline structure configuration system configured to generate user configuration mechanisms that are actuatable to configure the chronological display structure to include display elements corresponding to an identified set of activities having different activity types.

\* \* \* \* \*